US007991542B2

(12) United States Patent
Giles et al.

(10) Patent No.: US 7,991,542 B2
(45) Date of Patent: Aug. 2, 2011

(54) MONITORING SIGNALIZED TRAFFIC FLOW

(75) Inventors: Bradley C. Giles, American Fork, UT (US); Michael J. Miller, Pleasant Grove, UT (US)

(73) Assignee: Wavetronix LLC, Lindon, UT (US)

( * ) Notice: Subject to any disclaimer, the term of this patent is extended or adjusted under 35 U.S.C. 154(b) by 751 days.

(21) Appl. No.: 11/689,441

(22) Filed: Mar. 21, 2007

(65) Prior Publication Data

US 2007/0222639 A1  Sep. 27, 2007

Related U.S. Application Data

(60) Provisional application No. 60/785,964, filed on Mar. 24, 2006.

(51) Int. Cl.
*G06G 7/76* (2006.01)
*G08G 1/95* (2006.01)
(52) U.S. Cl. ......... 701/119; 701/118; 340/907; 340/933
(58) Field of Classification Search .......... 701/117–119, 701/200–202, 213–215; 340/907, 909–911, 340/933, 937, 943
See application file for complete search history.

(56) References Cited

U.S. PATENT DOCUMENTS

| | | | |
|---|---|---|---|
| 4,167,330 A | 9/1979 | Haville | |
| 4,908,615 A | 3/1990 | Bayraktaroglu | |
| 5,339,081 A | 8/1994 | Jefferis et al. | |
| 5,663,720 A | 9/1997 | Weissman | |
| 5,721,194 A | 2/1998 | Yandrofski et al. | |
| 5,793,491 A | 8/1998 | Wangler et al. | |
| 5,798,983 A | 8/1998 | Kuhn et al. | |
| 5,962,114 A | 10/1999 | Jonza et al. | |
| 6,037,894 A | 3/2000 | Pfizenmaier et al. | |
| 6,118,405 A | 9/2000 | McKinnon et al. | |
| 6,124,807 A | 9/2000 | Heckeroth et al. | |
| 6,144,973 A | 11/2000 | Fujii et al. | |
| 6,490,519 B1 * | 12/2002 | Lapidot et al. | 701/117 |
| 6,556,916 B2 | 4/2003 | Waite et al. | |
| 6,693,557 B2 | 2/2004 | Arnold et al. | |

(Continued)

FOREIGN PATENT DOCUMENTS

GB          1443701          7/1975

OTHER PUBLICATIONS

International Search Report and Written Opinion from PCT/US2007/064711, dated Sep. 4, 2008, 10 pages.

(Continued)

*Primary Examiner* — Yonel Beaulieu
(74) *Attorney, Agent, or Firm* — Workman Nydegger

(57) ABSTRACT

The present invention extends to methods, systems, and computer program products for monitoring signalized traffic flow. A processor in a sensor system or traffic controller interface estimates the time-of-arrival and other traffic flow estimates of one or more vehicles to an intersection stop bar, while the vehicles are within a continuous range of one or more transducers view of the sensor system. A level of efficiency and safety within the signalized traffic flow is estimated by the sensor system based upon one or more of the estimated time-of-arrival and other flow variables estimates and then communicated to the control unit of the traffic signal system. Other flow estimates for each vehicle include but are not limited to: position relative to the stop bar, lane position, velocity, acceleration, time headway and classification.

52 Claims, 11 Drawing Sheets

U.S. PATENT DOCUMENTS

| | | |
|---|---|---|
| 6,781,523 B2 | 8/2004 | Matsui et al. |
| 6,888,474 B2 | 5/2005 | Sharp et al. |
| 7,089,422 B2 | 8/2006 | Huntingdon et al. |
| 7,317,406 B2 | 1/2008 | Wolterman |
| 7,327,280 B2 * | 2/2008 | Bachelder et al. ............ 340/906 |
| 7,408,479 B2 * | 8/2008 | Johnson ........................ 340/917 |
| 7,421,334 B2 * | 9/2008 | Dahlgren et al. ............. 701/117 |
| 7,426,450 B2 | 9/2008 | Arnold et al. |
| 7,427,930 B2 | 9/2008 | Arnold et al. |
| 7,501,976 B2 | 3/2009 | Manor |
| 7,573,400 B2 | 8/2009 | Arnold et al. |
| 2005/0046597 A1 | 3/2005 | Hutchison et al. |
| 2005/0231384 A1 | 10/2005 | Shimotani |
| 2005/0242306 A1 | 11/2005 | Sirota et al. |
| 2006/0287807 A1 | 12/2006 | Teffer |
| 2007/0009694 A1 | 5/2007 | Arnold et al. |
| 2007/0152869 A1 | 7/2007 | Woodington et al. |
| 2007/0208495 A1 | 9/2007 | Chapman et al. |

OTHER PUBLICATIONS

U.S. Appl. No. 60/439,109, Jan. 10, 2003, Arnold et al.
U.S. Appl. No. 11/311,103, Dec. 19, 2005, Arnold et al.
U.S. Appl. No. 60/785,964, Mar. 24, 2006, Giles et al.
U.S. Appl. No. 11/614,250, Dec. 21, 2006, Arnold et al.
U.S. Appl. No. 61/185,005, Jun. 8, 2009, Arnold et al.
U.S. Appl. No. 12/502,965, Jul. 14, 2009, Arnold et al.
U.S. Appl. No. 12/546,219, Aug. 24, 2009, Arnold et al.
U.S. Appl. No. 12/546,196, Aug. 24, 2009, Arnold et al.
U.S. Appl. No. 12/710,736, Feb. 23, 2010, Arnold et al.
International Search Report and Written Opinion from PCT/US2010/037602 dated Aug. 6, 2010.
UMRR: A 24GHz Medium Range Radar Platform, Smart Microwave Sensors GmbH, Jul. 25, 2003.
The UMRR 24GHz Radar Sensor Family for Short and Medium Range Applications, Smart Microwave Sensors GmbH, Apr. 8, 2004.
A 24 GHz ACC Radar Sensor, Smart Microwave Sensors GmbH, Feb. 28, 2005.
Klotz et al., "An Automotive Short Range High Resolution Pulse Radar Network," Jan. 2002.
SmarTek Acoustic Sensor—Version 1 (SAS-1), Installation and Setup Guide; Apr. 3, 2003.
University Research in Support of the Department of Transportation Program on Remote Sensing Applications in transportation (DTRS56-00-BAA-0004), Nov. 1999.
Cambridge Consults; Technology at the crosswords: new radar sensor allows pedestrians and traffic to coexist; Feb. 24, 2004.
Transportation Systems Railway Grade Crossing Sensor, Aug. 17, 2004, 1 pg.
Transportation Systems Millimeter Wave Radar Traffic Sensor, AutoTrak, Aug. 17, 2004, 2 pgs.
Image Sensor for Measuring Volumes By Direction, Atsushi Saito, International Sales & Marketing Department, Social Systems Solution & Service Business Company, OMRON Corporation, Tokyo Japan, ITS World Congress, Oct. 2004, 1 pg.
Computer Vision Algorithms for Intersection Monitoring; Harini Veeraraghavan, Osama Masoud, and Nikolaos P. Papanikolopoulous, Senior Member, IEEE, IEEE Transactions on Intelligent Transportation Systems, vol. 4, No. 2, Jun. 2003.
Red Light Hold, Radar-based system prevents collisions from red light runners, Optisoft The Intelligent Traffic Signal Platform, 2 pgs.
Transportation Sensors, Optional features for the OptiSoft ITS Platform, Optisoft The Intelligent Traffic Signal Platform, 1 pg.
Office Action dated Nov. 4, 2009 from U.S. Appl. No. 11/614,250.
International Search Report for PCT/US2010/037596 dated Aug. 19, 2010.
Examination Report from Canadian Patent Application No. 2512689, dated Sep. 30, 2010.
"Dilemma Zone Detector (DZD): Summary Requirements" ISS & Econolite at wavetronix, Jul. 18, 2003.

* cited by examiner

MONITORING SIGNALIZED TRAFFIC FLOW

CROSS-REFERENCE TO RELATED APPLICATIONS

The present application claims priority from U.S. provisional patent application Ser. No. 60/785,964, filed Mar. 24, 2006 and entitled "Intersection Dilemma Zone Protection" which provisional application is incorporated herein by reference in its entirety.

BACKGROUND

Background and Relevant Art

The operational efficiency and safety of traffic flow at signalized intersections is imperative to mobility within the public transportation network. Congestion-based delay, fuel consumption, and pollution at signalized intersections are increasing problems worldwide as the number of vehicle-miles traveled increases year after year. In addition, the number of collisions that result in death, personal injury, and property damage at signalized intersections has increased in recent decades. In many rural and urban areas the number of intersections that warrant and are installed with signalized traffic control devices is increasing rapidly.

When traffic signals are installed at an intersection, efficient operation is achieved by timing the signals so that the flow rate of vehicles through the intersection is as close to capacity as practical. The capacity usage of actively flowing through-movements is commonly measured by monitoring the time duration between traffic sensor signals sent over traffic detector channels. The time duration between signals is usually an approximation of the time headway between two vehicles. Since the time headway is the reciprocal of the flow rate, a shorter duration represents a higher flow rate. If the time duration between signals on a specific channel is shorter than two or three seconds, then flow of vehicles is usually estimated to be near capacity. However, if the time duration between signals is longer, the active movements are not estimated to be operating near capacity and may be terminated if there is competing demand on a conflicting movement.

By timing the duration of green during near capacity flow on active movements, and queuing traffic to increase the duration and rate of discharge flow at the upcoming start of green on conflicting movements, traffic signal systems can effectively manage the ever-changing levels of demand arriving on each approach of an intersection.

In many cases traffic signals at intersections are installed as a traffic safety treatment. The installation of traffic signals at an intersection will generally reduce the most dangerous types of collisions, right-angle collisions. However, it is recognized by traffic officials that the installation of traffic signals also increases the frequency of the relatively less hazardous rear-end collisions.

Rear-end collisions at signalized intersections occur frequently when a signal light transitions through a green-amber-red sequence of indications that end a phase of traffic movements. These rear-end collisions are more dangerous at intersections where vehicles travel at high speeds. In many areas the number of intersections with high-speed approaches is increasing.

At the end of green, the onset of the amber indication forces drivers approaching an intersection to decide whether to try to stop behind the stop bar, or proceed through and clear the intersection. The duration of the amber indication may vary by several seconds for intersections of different lengths and design speeds. The duration of the amber indication is usually longer for wide intersections with high-speed approaches. A longer duration is intended to provide drivers, which cannot stop safely and comfortably, an option to safely cross the stop bar before the signal light turns red. In cases where the duration of amber is not long enough to provide a safe option to stop or go, the driver is in a physical dilemma. Fortunately, this type of physical predicament can be prevented by increasing the duration of amber programmed into the traffic control unit, or decreasing the lawful speed of travel on the approach. Unfortunately, removal of this preventable predicament does not eliminate the dilemma zone.

For example, even with adequate amber time and only one driver on an approach of an active traffic phase, the decision to stop or go can be unclear because of the unexpected nature of the onset of amber, the variant nature of its duration, and the driver's perception of speed, distance, and time.

If the length of the amber duration is increased so large that drivers which can stop safely can also clear the intersection, then the drivers are presented with an option zone. In the option zone the driver can safely select either alternative, as long as there are no other vehicles on the approach. When traveling on a given approach, drivers traveling at higher speeds have a smaller option zone, than drivers traveling at lower speeds. The presentation of two potentially safe options can reduce the predictability of the driver's choice and may actually be dangerous in some cases. For example, consider the case of one vehicle following another on an approach.

If a leading driver successfully stops behind the stop bar, it is not sufficient that the following vehicle only have a safe stopping distance to the stop bar. The following vehicle must also have a large enough time headway in order to have a safe stopping distance relative to the leading vehicle. If the lead vehicle can decelerate faster than the following vehicle, this can be problematic when the time headway is small. Furthermore, the following driver must anticipate the decision of the leading driver, during the time that elapses before any brake light signals appear. Factors such as the mindset of the individual drivers and their reaction times also complicate the choice to stop or go.

With all the factors involved, one cannot reliably predict the behavior of drivers who are within about three to five seconds of reaching the stop bar when the signal light turns amber. Traffic officials who have studied the stopping probabilities of drivers at the onset of amber estimate that about 90% of drivers will try to clear the intersection if they are within 2.5 seconds of the stop the stop bar, and about 90% of drivers will try to stop if they are within 5.5 seconds. This span of arrival times predominantly characterizes what can be described as a time-based zone of unpredictability or more commonly as a dilemma zone.

In addition to the dilemma zone span of arrival times, a dilemma zone can be defined further defined by a span of velocities, and span of distances.

The dilemma zone span of velocities is the broad span of velocities in which drivers experience the dilemma of whether to stop or go. The dilemma zone span of velocities covers speeds from about 35 mph to 65 mph. Drivers of stopped vehicles or vehicles moving less than 35 mph are typically not in a dilemma when the amber indication occurs since they are stopped or can stop. Rarely is the posted speed limit 70 mph or higher on the approach to a signalized intersection. As a result, drivers traveling 70 mph or faster have a speeding problem first and foremost. These drivers are outside the bounds of the typical stop or go problem.

The dilemma zone span of distances is the broad span of distances in which drivers experience the stop or go dilemma.

The dilemma zone span of distances is largely tied to the dilemma zone span of velocities. For 35 mph approaches, the problematic distance span is about 150 feet. For 65 mph approaches the problematic distance span is often at least 400 feet. In both cases, the dilemma zone span of distances ends about 125 feet from the stop bar.

In order to operate an intersection near capacity and reduce the number of drivers that experience the stop or go dilemma, mechanisms for monitoring signalized traffic flow have been introduced or implemented. These mechanisms often involve the placement of one or more detection zones at or in advance of the stop bar. A detection zone is a physical area of detection above, below, or on a roadway as provided by one or more devices. One or more devices provide the number of detection zones required for a particular mechanism for monitoring signalized traffic flow. A sensor is one or more devices that provides one or more detection zones. A detector is a detection zone provided by a sensor. When detectors are used in advance of the stop bar they are often called advanced detectors. Advance detectors can be used to implement a variety of intersection safety mechanisms One safety mechanism includes monitoring signalized traffic flow allow the flow of active traffic movements to continue by extending the duration of the green indication beyond a minimum green (i.e., green extension). The minimum green is used, among other reasons, to allow some portion of vehicles queued up at the stop bar to travel through the intersection when their phase is called. The green extension mechanism provides effective operations when traffic is flowing near capacity and enables drivers to avoid collisions and other traffic conflicts by clearing their dilemma zones. However, when conflicting demand arrives on other traffic movements at a signalized intersection, these vehicles cannot be delayed indefinitely. Accordingly, a maximum green timer limits the duration of the green indication after conflicting demand is registered. For isolated intersections, the maximum green limit is commonly thirty seconds or higher. With closely-spaced coordinated intersections, the time window for green extension on the coordinated or actuated phases is commonly fifteen seconds or shorter, in order to limit the length of the cycle.

Both superior efficiency and safety can be afforded by a green extension mechanism for monitoring signalized traffic flow. During the window of time before the maximum green limit is reached, the natural time headway between vehicles is often likely to span the dilemma zone. When headways in traffic span the dilemma zone, it is both efficient to begin inactive traffic movements and safe to end active traffic movements. At some intersections the rate at which sufficient headways will appear during peak hours of traffic flow is not consistent or sufficient, and so the maximum green limit can dynamically increase or decrease.

Green extension mechanisms for monitoring signalized traffic flow can detect capacity usage by estimating the headway between vehicles on an approach using a detector placed at or near the stop bar. However, it is more efficient to monitor capacity usage in advance of the stop bar, since statistically most drivers within 2.5 seconds of arriving at the stop bar at the onset of amber will attempt to clear the intersection. Advance monitoring will increase the effective green time of the active movements by helping to synchronize passage of the last vehicle several seconds after amber has been displayed. This will also help release the queued vehicles on conflicting movements earlier and can reduce the vehicle-hours of delay at the intersection significantly.

Another safety mechanism monitors for incidents (e.g., traffic accidents) that result in abnormal traffic conditions (i.e., incident detection). Incident detection mechanisms alert traffic officials of alarming traffic conditions so that an appropriate response can be formulated. However, at least one disadvantage of incident detection is that the collision has already occurred, and the safety of the motorists and efficiency of the traffic network have already been disrupted. Thus, incident detection is less effective than green extension because traffic conditions are detected too late. As a result, while green extension mechanisms have been shown to reduce the number of rear-end and right-angle collisions at an intersection by monitoring time headway in advance of the stop bar, incident detection mechanisms have not.

Another safety mechanism tracks and identifies possible red light runners based upon speed, time, and distance from entering an intersection and extends the duration of a red indication (i.e., red extension) to avoid collisions of red-light runners. However, at least one disadvantage of red extension mechanisms is that they do not reduce the number of red-light runners. In fact, red extension mechanisms reward red-light runners with additional time to clear the intersection, and may increase the frequency of red-light running over time.

Another disadvantage of red extension is that it only detects one type of traffic conflict shown to be reduced by green extension mechanisms. The other conflicts include: acceleration through yellow, brakes applied before passing through intersection, vehicle skidding, swerve to avoid collision, and abrupt stop. Another disadvantage of red extension is its reliance upon an additional red-light controller unit necessary for integration with many traffic controllers.

Many mechanisms for monitoring signalized traffic flow use at least one presence detector. A presence detector will report the existence of a stopped or moving vehicle within the effective length of its detection zone. Common presence detectors include inductive loop detectors and virtual loop video detectors. One disadvantage of using a presence detector for green extension is that the detector cannot distinguish between flowing traffic and traffic at a standstill. For example, when used with a green extension mechanism, a presence detector will signal the traffic signal system's control unit to extend green assuming that vehicles are moving after the minimum green time has expired. The control unit, or traffic controller, will reset a count down timer to the value of the programmed "passage time" when presence is detected. If the detector signals the traffic controller of a vehicle's presence at any time before the timer expires, then this mechanism estimates that traffic is flowing near capacity. However, in the event that vehicles are stopped over the detectors due to downstream flow restrictions, presence will be continuously signaled even though traffic is not flowing at all. This can unnecessarily aggravate delay on the inactive traffic movements by extending green to its maximum limit and wasting the capacity of the intersection.

Another disadvantage of using a presence detector with a green extension mechanism is the inability to detect the time headway between vehicles without a bias. The time headway between two vehicles is the time taken by the front extent of the following vehicle to reach the location of the front extent of the leading vehicle on the roadway. Since a presence detector will signal the control unit of the traffic signal system for the entire time a vehicle occupies it zone, a presence detector will under-estimate time headway and over-estimate capacity usage. In other words, a presence detector will detect the time gap between vehicles, where the time gap between two vehicles is the time required by the front extent of the following vehicle to reach the current location of the back extent of the leading vehicle.

Another disadvantage of using a presence detector with a green extension mechanism is that presence detectors are usually configured as point detectors in order maintain the ability to resolve time gaps between closely following vehicles.

Typical mechanisms for monitoring signalized traffic flow use at least one point detector. A point detector only covers a short distance on the roadway, typically 25 feet or less. The shortness of the detection zone is one of the weaknesses of a point detector. One point detector only gives partial coverage of the span of arrival times and broad span of distances that represent a dilemma zone. For example, one point detector covers approximately less than twelve percent of the dilemma zone on a 50 mph approach to an intersection. To provide better coverage of the dilemma zone, more than one point detector is often recommended for better protection.

Another disadvantage of using one or more point detectors for monitoring signalized traffic flow relates to the shortness of their length, as well as their sensitivity of detection. A vehicle traveling at a velocity that is within the dilemma zone span of velocities can pass over the detector in less than a quarter of a second. Even at slower velocities within the dilemma zone span of velocities, the vehicle will only be in the detection zone for about one half of a second. If the point detector sensitivity is set too low, the point detector may miss detecting a vehicle. This will jeopardize the safety of this vehicle and its occupants. If the point detector sensitivity is set too high, the point detector may falsely report detection and when used with a green extension mechanism may extend wastefully green closer to the maximum green time, even if the capacity of the approach is significantly underutilized. If the maximum green time is reached, vehicles may be caught in a dilemma zone when the signal light is forced to the amber indication.

Thus, each point detector's sensitivity must be precisely calibrated for robust detection. With sensor technologies that do not provide for automatic calibration and do not have a wide range of sensitivity, the time required to configure a detector can be lengthy. Configuring a detector involves selecting all the appropriate parameters for its operation. This includes detector location, sensitivity, and a host of other settings often specific to a particular manufacturer's sensor. The manufacturer, prior to installation of the sensor, can do some pre-configuration. Configuration done by the manufacturer can be customized for a particular situation, or it can be a default configuration for multiple situations. However, in many cases much of the configuration is by an installer using a configuration utility. The configuration utility is often a portable computer running manufacturer specific software that is operated at the installation site. In other instances, the configuration utility can be operated remotely over a long-distance communication link back to a management center. In either case, the configuration utility can be part of a traffic management system.

Another disadvantage of the using one or more point detectors for monitoring signalized traffic flow relates specifically to failure of a single point detector. If a single point detector fails due to the sensitivity and shortness of detector, there is no redundancy built into most mechanisms. Furthermore, if more than one point detector is provided by an aboveground sensor, it is likely that at times the detection area of one or more detectors can be totally occluded by vehicles in the traffic stream. Total occlusion of the detection area can cause the detector to fail to detect vehicles in a point detection zone. Total occlusion of the detection area can also cause the detector to falsely detect a vehicle. During times of total occlusion, a single point failure will jeopardize the safety and impact the capacity measurement capabilities of the system.

Even worse, if just one point detector permanently fails, this single point failure will permanently invalidate the mechanism's monitoring capabilities for that lane of the approach. When multiple point detectors are used for a given mechanism of monitoring signalized traffic flow, the detector inputs to the traffic control unit are often grouped, which can cause a malfunctioning detector difficult to discover. This is especially true with inductive loop sensors, where a separate sensor is used for each detector. In this case, the failure of one sensor will cause the mechanisms to fail, and this failure may not be obvious to discover. This is alarming, especially given the historically high failure rate of inductive loop sensors.

Another disadvantage of point detection based mechanisms is that time headway is usually only estimated at the point of detection at the time the following vehicle enters the detection zone. This measurement of time headway can be termed as lagging time headway, and is usually estimated by a system including a point detector and a controller. Since vehicles can be traveling at different speeds and vehicles can be expected to be accelerating or decelerating when approaching the stop bar, the measurement of lagging time headway is an approximation of time headway based upon the average speeds of vehicles over the last several seconds, and if often outdated at the time the estimate is finally completed. Furthermore, if multiple point detectors are used, the identity of vehicles is not typically passed from one detector to the next, making lagging time headway impossible to resolve especially in the presence of lane changing, vehicle passing, or acceleration.

Another disadvantage of point detection based mechanisms is that a lagging time headway between vehicles spanning the dilemma zone cannot be detected without the passage of one or more seconds of time. If one or more point detectors are situated within the dilemma zone, this passage time requirement can cause the detection of time headways spanning the dilemma zone to be missed or delayed. If the detection of a time headway spanning the dilemma zone is delayed, this means that a larger time headway is required than is actually necessary. By missing smaller headways and requiring larger headways in traffic, the passage time requirement is more likely to cause the maximum green time to be reached. When the maximum green limit is reached the mechanism for monitoring signalized traffic flow is compromised. Furthermore, if one or more point detectors are used upstream of the dilemma zone span of distances, the passage time requirement can cause the accuracy of predictions to deteriorate if vehicles accelerate or decelerate. This deterioration can in fact be expected because the vehicles are approaching a planned point of conflict in the roadway. For example, the expectation of the onset of the amber indication, or the onset of an advanced warning signal, often causes vehicles to accelerate or decelerate.

Another disadvantage of point detector based mechanisms is that the speed of the vehicles can only be estimated at points within the dilemma zone. Furthermore, if only one point detector is used, typically the speed is not estimated at all. In the rare event that a single inductive loop sensor provides a point detector to estimate speed, the average length of vehicles bias the estimate. On the other hand, if multiple point detectors are used the speed can be unbiased for vehicles of any length, but the estimates are only the average speed of the vehicles between the detectors. When only average speed between two points is detected, the speed of accelerating or decelerating vehicles will be biased low or high, respectively. Finally, since the average speed can only be known after passing a secondary detector, the passage of one or more seconds of time is often required to detect average speed with advance detection.

Another disadvantage of point detector based mechanisms is that acceleration of vehicles is typically not calculated. If it were to be calculated, acceleration can only be estimated at the location of the point detectors and requires the passage of time.

Another disadvantage of point detector based mechanisms is that arrival times to the stop bar can only be estimated or revised once vehicles pass discrete points on the roadway. Furthermore, these arrival times are typically based upon the average speed of the vehicle between detectors and can only be calculated at the time the vehicle is over a point detector.

Another disadvantage of point detector based mechanisms is that point detectors are placed at fixed locations.

Most mechanisms for monitoring signalized traffic flow use one or more fixed location detectors. Fixed location detectors are usually placed based upon fixed design assumptions. For example, it is common to place a solitary fixed location detector somewhere between three to five seconds in advance of the stop bar. In many cases, this placement assumes a specific design speed. Often the design speed is the eighty-fifth percentile speed of the roadway, meaning the speed under or at which eighty-five percent of motorists are expected to drive.

One disadvantage of fixed location detectors is that due to speeding and congestion it is possible that only a minority of vehicles pass over the fixed location detector at the selected design speed. This reduces this effectiveness of the design. Another disadvantage of fixed location detectors is that when multiple fixed location detectors are used, the precise placement of each detector in relation to the others and to the stop bar is crucial to the designs effectiveness.

Another disadvantage of fixed location detectors is that detector placement is often the only degree of freedom that determines which arrival times or speeds are protected. When the arrival time or speed protection needs to be changed, the detector placement scheme must be changed. With intrusive fixed location detectors like in-pavement loops, changing detector placement is costly. With non-intrusive point detectors, changing detector placement is less costly, as long as one or more transducer views will cover the span of distances to be protected. Even so, changing detector placement is not an entirely straightforward way of adjusting arrival time and speed protection.

Another disadvantage of fixed location detectors is that when growth of the transportation network dictates the need to shift lanes, or rework the geometry of the intersection in any way, the fixed in-pavement location detectors will often represent sunk costs.

Additionally, with aboveground non-intrusive sensors that provide a passive transducer view, the placement of the fixed location detectors is often used to calibrate the range of the detector view. Typically, this requires precise manual marking of the roadway, and can compromise the personal safety of the installer. An aboveground sensor is a sensor that is situated above the surface of the roadway. A non-intrusive sensor is a sensor that can be installed without impacting the portion of the road surface it detects. A passive transducer view is a field of view created by a sensor that only receives a signal. A transducer that provides a passive transducer view does not transmit a signal.

At least one first mechanism for monitoring signalized traffic flow uses one sensor to provide one presence point detector at a fixed location. This point detector is placed at a distance near the beginning of the dilemma zone. Actuations by the advanced detector signal a traffic controller to hold the light green until a desired gap in traffic is detected, or until the maximum green duration is reached. A desired gap in traffic is detected by the controller if the passage timer expires.

This first mechanism experiences all the relevant disadvantages generic to point detection at fixed locations. Another disadvantage of this mechanism is that it can only offer the most efficient dilemma zone protection for vehicles that travel at the design speed, and it can only achieve this level of effectiveness by limiting protection at other speeds. For example, if the traffic controller passage time is increased to accommodate vehicles traveling slower than the design speed, this unnecessarily overextends the duration of green for vehicles traveling at the design speed. And because the sensor was placed based upon a design speed, the placement of the sensor actually reports detection of a vehicle traveling slower than the design speed before it is in a dilemma zone.

Similarly, vehicles that travel faster than the design speed will only be protected once they reach the detector, even though they are likely to be within the dilemma zone span of arrival times before they reach the detector. In addition, because the passage time was selected to accommodate the design speed, or in some cases a speed slower than the design speed, vehicles traveling faster than the design speed will unnecessarily overextend the duration of green. Overextension may cause time headways spanning the dilemma zone to be missed and increases the likelihood of reaching the maximum green duration without providing a safe termination of the active traffic movements. At the same time, under-protection can falsely signal the controller that it is safe to end the traffic movements when a vehicle may be in a dilemma zone.

Another disadvantage of this first mechanism is that in order to increase protection for a span of speeds around the 85% speed, the controller passage time may need to be increased to a value greater than two or three seconds. By increasing the passage time to larger values, the ability to detect when the flow rate of traffic is near capacity is compromised. Because of this disadvantage, some mechanisms that use fixed-location point detectors will dynamically decrease the amount of passage time as the time after the start of the active traffic phase increases. This feature is common to standard traffic controllers and is called gap reduction. The initial duration of an acceptable time gap is called the passage time, and the final duration of the acceptable time gap is called the minimum gap. This feature allows the traffic controller, as the decision maker, to increase the efficiency requirements and relax the safety criteria for green extension as the active traffic phase progress closer towards the maximum green limit.

Another second mechanism of monitoring signalized traffic flow uses one or more sensors that provide multiple point detectors at fixed locations. Traffic officials have designed numerous point detector placement strategies for this mechanism. The first detector is usually placed at a distance that provides a safe stopping distance for vehicles traveling at the design speed. The other detectors are then spaced to allow vehicles traveling at speeds slower than the design speed to travel from one detector to the next within a fixed passage time. This provides protection for vehicles traveling at some speeds below the design speed. Actuations by the advanced detectors signal a traffic controller to hold the light green until a desired gap in traffic is detected or the maximum green duration is reached.

This second mechanism also experiences all the relevant disadvantages generic to point detection mechanisms. It does reduce the amount of overextension and under-protection when compared to single point detector at fixed location mechanisms, but these inefficiencies and hazards are not completely eliminated. In addition this second mechanism will have a higher rate of failure than a single detector mechanism, because it has multiple points of failure. In other words, for the second mechanism to operate properly every point detector must not fail to detect a vehicle. Furthermore, with inductive loop sensors and video sensors, the multiple detectors cannot be provided by one sensor for the detector placement strategies on the highest speed approaches. This requires the additional cost of installing and configuring multiple sensors.

Another third mechanism for monitoring signalized traffic flow uses one or more sensors to provide multiple point detectors at fixed locations within the dilemma zone span of distances as described in the previous mechanism. The enhancement of this mechanism is that the traffic controller contains additional logic to dynamically extend the maximum green limit according to a cost function that weights delay on the inactive traffic movements, against safety on the active traffic movements. This third mechanism also experiences all the relevant disadvantages generic to point detection mechanisms. Another disadvantage of this third mechanism is the need to upgrade or replace the traffic controller.

Another fourth mechanism for monitoring signalized traffic flow uses one or more sensors to provide multiple point detectors within the dilemma zone, similar to the second and third mechanisms. The first two detectors are placed at the beginning of the dilemma zone and used as a speed trap and to detect classification. The other detectors are then spaced to allow vehicles traveling at speeds slower than the design speed to travel from one detector to the next within a fixed passage time. The enhancement of this fourth mechanism is that it will indefinitely hold the light green if a vehicle classified as being a truck is in the dilemma zone.

This fourth mechanism experiences all the relevant disadvantages generic to point detection mechanisms. Another disadvantage of this fourth mechanism is that it cannot be used at closely spaced coordinated intersections because of the need to have a deterministic maximum to the cycle length.

Another fifth mechanism for monitoring signalized traffic flow uses one point detector some distance upstream from the dilemma zone span of distances. This point detector, in conjunction with the controller passage time, looks for a drop in capacity usage. This fifth mechanism uses an advanced warning signal, which is a signal that alerts drivers upstream of the dilemma zone that the signal light will soon turn to the amber indication, if it has not already. An advance warning signal can be a flasher or a variable message sign. An advanced warning signal is placed at the beginning of the dilemma zone for vehicles traveling at the design speed. The traffic controller is programmed with a fixed passage time of a few seconds. The passage time allows vehicles traveling at an average speed below the design speed to see the onset of the advanced warning signal.

This advanced warning signal flashes for several seconds before the onset of the amber indication and warns the upstream drivers that the onset of the amber indication is about to occur. At the same time, the passage time allows vehicles traveling at an average speed at or above the design speed to reach or pass the beginning of their dilemma zone, without seeing the onset of the advanced warning signal. Since the drivers of these vehicles would not be able to see the advanced warning signal, the traffic controller is programmed with an advanced warning signal and amber duration that allows them to pass over the stop bar before the light turns red.

This fifth mechanism experiences all the relevant disadvantages generic to point detection mechanisms. Furthermore, while this fifth mechanism essentially guarantees that vehicles traveling below the design speed will have been given advanced warning of the onset of the amber indication, it does not guarantee that these vehicles will not be in the dilemma zone. For example, even if the drivers heed the advanced warning signal by decelerating, the drivers may still be at an arrival time from the stop bar that causes a dilemma. Furthermore, some drivers may misuse the advanced warning of the onset of yellow, and actually accelerate into or through the dilemma zone.

Another sixth mechanism for monitoring signalized traffic flow uses multiple point detectors some distance upstream from the dilemma zone span of distances. An advanced warning signal is often placed near the beginning of the dilemma zone for vehicles traveling at the design speed. When two point detectors are used upstream, they are used with this mechanism to estimate the average speed of the vehicle using a speed trap. Additionally, a point detector is also used in conjunction with classification hardware to classify the vehicles in each lane by length.

The average speed and length classification information are sent to a computer, which predicts the danger level within the dilemma zone from the present time to some time horizon in the future. The predictions are made far enough into the future to provide drivers upstream (from the span of distances that correspond to the dilemma zone) a few seconds of advanced warning of the onset of the amber indication using a signal. During the time the computer predicts that it should not yet start flashing the advanced warning signal, it will signal the traffic controller to extend the green indication. When the computer finally predicts that it should start flashing the advanced warning signal, it will force the termination of green after some short delay.

This sixth mechanism experiences all the relevant disadvantages generic mechanisms that use point detection at fixed locations. Most notably, the average speed information may become quickly outdated when the driver accelerates or decelerates in approaching the stop bar.

Another seventh mechanism for monitoring signalized traffic flow uses multiple point detectors throughout and upstream of the dilemma zone. This mechanism recommends the use of multiple detectors and multiple video sensors to provide placement of the point detectors at fixed locations. The sensors are mounted at multiple locations. A series of point detectors are defined in each of the sensors to cover a portion of the span of distances. The broad distance covered by multiple sensors is used to report the presence and passage of all vehicles along the approach to a traffic controller. The traffic controller monitors these detections for a few seconds before the onset of the amber indication.

For this short time window, the traffic controller monitors the movement of vehicles from one point detector to the next, in order to calculate average speed of the vehicles between detectors. The average speed and current position of all the vehicles on the approach are used to predict the number of vehicles that will have neither a safe stopping distance nor a safe clearing distance at the onset of the amber indication. Based on these predictions, the traffic controller will determine the time for the onset of the amber indication.

This seventh mechanism experiences all the relevant disadvantages generic to point detection mechanisms that use multiple detectors at fixed locations. In addition, another disadvantage of this seventh mechanism is that while it uses point detectors to cover a broad span of distances, it does not use point detectors to protect a broad span of arrival times. It only protects vehicles at arrival times from the stop bar that do not have either a safe stopping distance or a safe clearing distance. It does not protect drivers that are likely to choose an unsafe option. Another disadvantage of this seventh mechanism is that it requires an upgrade or replacement of the traffic controller. Another disadvantage of this seventh mechanism is that the traffic controller only monitors the broad span of distances on the roadway for a few seconds, and would not be suitable for use in isolated intersections. Another disadvantage of this seventh mechanism is its reliance upon passive transducers.

The view of a passive video detector compresses non-linearly, meaning that further distances are represented by fewer pixels than closer distances. This means that the detection of distance and speed diminishes at far distances when both near and far detectors are defined with a single video sensor. The ability to use multiple point detectors around and beyond 250 feet from the stop bar is also limited, especially when detectors are also defined near the stop bar.

Since video sensors use passive transducer views, distance can only be determined by some external mechanism. A common mechanism is to have a person actively mark the roadway. An installer then manually draws a detector at the location where the mark on the roadway appears within the view of the configuration utility. Headlights and other visual miscues are likely to limit the ability of a video sensor to reliably provide point detectors at fixed locations during certain times of the day or night. Furthermore, if the video sensor moves slightly on the pole, the calibration of distance and speed as determined by the sensor is compromised. And as above-ground sensors, video-based point detectors can suffer from occlusion. With video, even partial occlusion of a detection zone causes false detections. False detections will tend to overextend the green duration and cause time headways in traffic over the dilemma zone to be missed.

BRIEF SUMMARY OF THE INVENTION

The present invention extends to methods, systems, and computer program products for monitoring signalize traffic flow. A processor (e.g., in a sensor system or a traffic controller interface) receives sensor data from a sensor that indicates the presence of one or more vehicles within a continuous range of one or more transducer views of the sensor. The processor detects an individual vehicle from within the received sensor data.

The processor estimates the position of the vehicle relative to a stop bar for the intersection. The processor estimates the velocity of the vehicle based on a change in the estimated position of the vehicle over a period of time.

The processor estimates a time-of-arrival to the stop bar for each uniquely detected vehicle based upon one of at least the estimated position and estimated velocity. The processor estimates the capacity usage of the roadway and protects the dilemma zone based upon the time-of-arrival estimates. The processor then signals the traffic controller when a specific level of efficiency and safety is detected within the flow of signalized traffic.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1A:
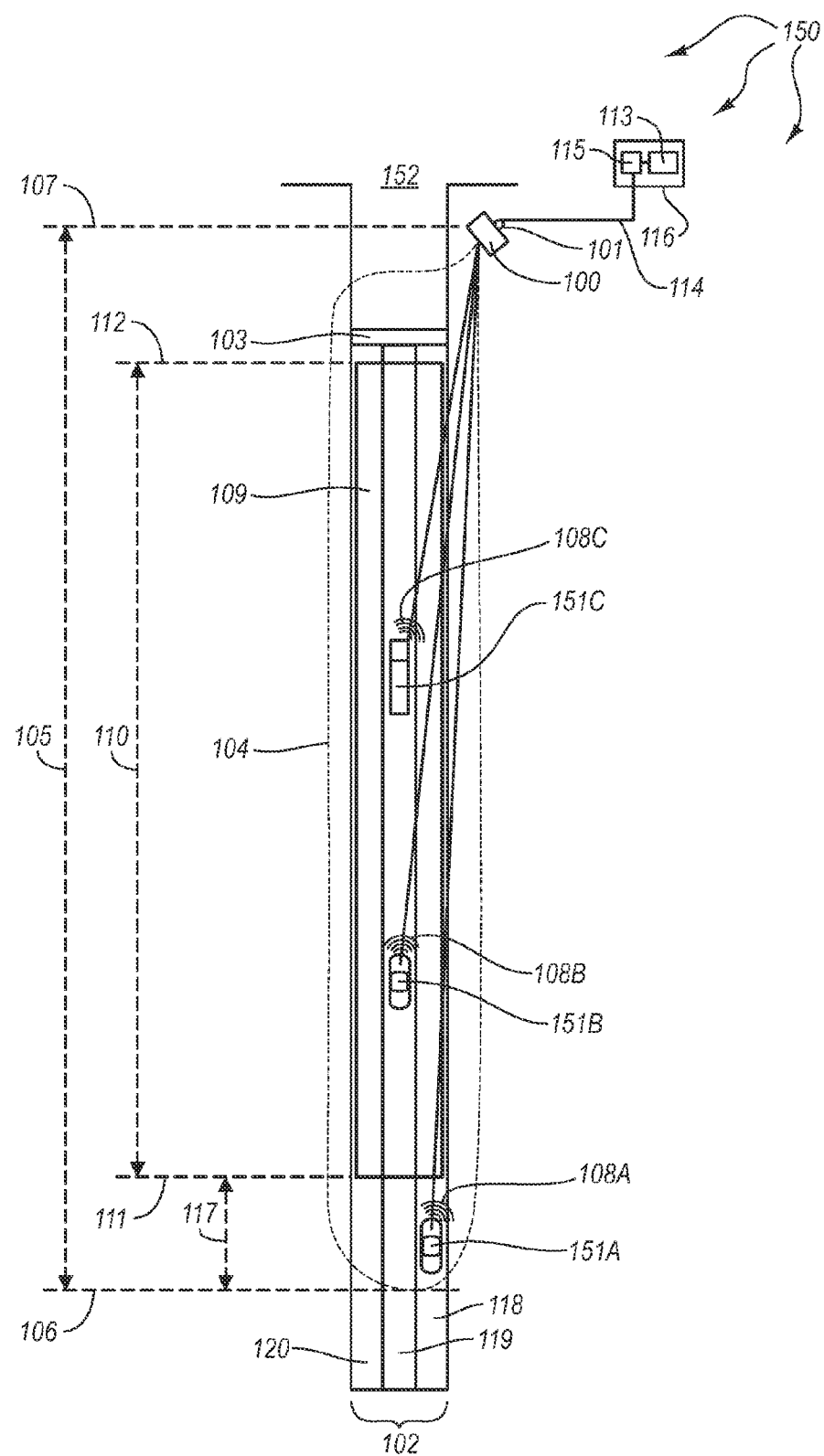
FIG. 1A illustrates a traffic monitoring system monitoring a portion of an approach to a stop bar.

The present invention extends to methods, systems, and computer program products for monitoring signalized traffic flow. A processor (e.g., in a sensor system or a traffic controller interface) receives sensor data from a sensor that indicates the presence of one or more vehicles within a continuous range of transducer views of the sensor. The processor detects an individual vehicle from within the received sensor data.

In some embodiments, the processor estimates the time-of-arrival of the vehicle to the stop bar while the vehicle is within the continuous range of the sensor, based upon at least an estimated position and estimated velocity for the vehicle. When traffic is free-flowing estimated time-of-arrival can be approximated by mathematically dividing the estimated position in relation to the stop bar by the estimated velocity. The processor may also estimate the time-of-arrival of the vehicle to the stop bar based upon one or more of an estimated lane position, an estimated classification, an estimated acceleration, and estimated time headway. These additional considerations can refine the estimated time-of-arrival based upon driver following behavior.

The processor estimates the position of the vehicle relative to a stop bar for the intersection based upon the estimated range of the vehicle from the sensor and orientation of the transducer view with respect to the roadway. The processor estimates the velocity of the vehicle based on a change in the estimated position of the vehicle over a specified time period. The processor estimates the lane position of the sensor based upon the estimated range of the vehicle from the sensor and orientation of the transducer view to the roadway. The processor estimates a classification of the vehicle based at least upon the length of the vehicle. The processor estimates the acceleration of the vehicle based on a change in the estimated velocity of the vehicle over the specified time. The processor estimates the time headway of the vehicle based upon the estimated velocity of the vehicle and distance from a single fixed point within the detection zone that a leading vehicle has passed within a known value of time. This fixed point can be the closest edge of the detection zone to the stop bar.

In some embodiments, the processor estimates the level of efficiency and safety of signalized traffic flow for the intersection approach based on the estimated time-of-arrival of the vehicle to the stop bar. The level of efficiency and safety of signalized traffic flow is based upon the capacity usage of flowing vehicles and the "stop or go" dilemma potential present for drivers in the traffic stream. By using the estimated time-of-arrival of vehicles to the stop bar, upcoming capacity usage at a critical point in the traffic flow (e.g. a stop bar) can be predicted by the processor. Capacity usage is determined by the time headway between vehicles. When estimated on a lane-by-lane basis, estimated time-of-arrival provides a prediction of the future time headway between vehicles at the stop bar. At the same time, the current "stop or go" dilemma potential can be calculated to ensure a measure of safety as well as to help increase the effective green time, by synchronizing passage of the last clearing vehicle a few seconds into amber.

In this description and in the following claims, a "dilemma zone" is defined as a span of arrival times, speeds, and distances near an intersection where driver decision making is not predictable with respect whether to stop at the intersection or attempt to clear the intersection in response to observing a green to amber transition at a traffic control signal device for the intersection. Generally, the unpredictable duration and onset of an amber indication can make it essentially impossible for traffic officials to predict the reaction of specific drivers within a certain span of arrival times, speeds, and distances from a stop bar at the onset of the amber indication. A significant proportion of drivers may try to stop behind the stop bar, even though the timing of the intersection is designed by the traffic officials for the driver to try to clear the intersection. On the other hand, a significant proportion of drivers may attempt to clear an intersection, even though the timing of the intersection is designed by the traffic officials for the driver to stop at the stop bar. Either of these situations can decrease the level of safety at an intersection.

Embodiments of the present invention can be used to discover and monitor traffic over a broad span of distances, including large percentages of the extent of the dilemma zone. For example, in one embodiment the invention sensor system 100, depicted in FIG. 1, has a detection span of approximately 400 feet. Thus, sensor system 100 can be mounted to cover the distances 128 to 528 feet from stop bar 103. Thus, sensor system 100 can monitor traffic flow for a span of arrival times from 2.5 to 5.5 seconds for vehicles traveling in a span of velocities from 35 to 65 mph.

In another embodiment the invention sensor system 800, depicted in FIG. 8, has a detection span of approximately 1000 feet. This broader detection span can be used to monitor a dilemma zone and also see upstream and downstream from the dilemma zone (e.g., using front fire transmitters and/or transceivers). This is advantageous since monitoring vehicles downstream from the dilemma zone can impact decision, headway, and deceleration aspects of traffic flow. This is also advantageous since monitoring vehicles upstream from the dilemma zone provides a horizon for predicting future conditions related to capacity usage at the stop bar and the dilemma zone. This invention also allows for estimation of the lane position and classification of each vehicle. When there are multiple lanes on an approach, estimation of the lane position is necessary for the accurately monitoring of the predicted time headway between vehicles at the stop bar.

FIG. 1 illustrates a traffic monitoring system 150 monitoring a portion of roadway approach 102 approaching the stop bar 103 for signalized intersection 152. Within traffic monitor system 150, sensor system 100 (mounted on pole 101) provides a single forward-firing transducer view 104 of approach 102. Sensor system 100 can provide coverage of a broad continuous span of arrival times to stop bar 103, velocities, and distances within distance span 105 along an approach 102 that are useful for monitoring signalized traffic flow.

The transmitter and/or transceiver in sensor system 100 can transmit an electromagnetic wave front of known power across transducer view 104. Thus, vehicles approaching stop bar 103 (e.g., vehicles 151A through 151C) which pass view entry point 106 can be discovered and continuously monitored within distance span 105, until the vehicles pass exit point 107. Within distance span 105, vehicles reflect any transmitted wave front, at a reflected power level, back to a receiver and/or transceiver in sensor system 100. Reflected signals depicted as reflected waves 108A through 108C are thereafter processed by components of sensor system 100. A power level of a reflected wave 108 indicates existence of vehicles.

One or more detectors can be defined within the transducer view 104 to report discovered vehicles. For example, detector 109 is depicted as being configured to report vehicles within the broad span of distances 110 between upper distance bound 111 and lower distance bound 112. Upper distance bound 111 and lower distance bound 112 are defined by their position relative to stop bar 103.

Within the broad span of distances 110, detector 109 of sensor system 100 can be further configured to monitor an estimated time-of-arrival to stop bar 103 and a velocity approaching stop bar 103 on a per vehicle basis. Components of sensor system 100 can receive and process reflected waves 108 (e.g., reflected waves 108A through 108C) to determine when vehicles are within distance span 110. Components of sensor system 100 can also be configured to receive and process reflected waves to determine the estimated time-of-arrival and estimated velocities of vehicles within span 110.

A discovery zone is defined as the distance span 117 between entry point 106 and upper distance bound 111. The transmitter/receiver combination or transceiver transmitting and monitoring within transducer view 104 can be configured in essentially a forward-fire orientation and use the distance span 117 to determine existence and velocity of vehicles before they enter distance span 110 of detector 109. A forward-fire orientation places a transducer view with a length of its view oriented primarily up and down the approach 102, and a width of its view across the width of approach 102. A transducer view 104 oriented exactly parallel to an approach 102 is exactly forward-fire.

In some embodiments, a forward-fire transducer view 104 can be oriented pointing towards oncoming traffic as depicted in FIG. 1. In other embodiments, a forward-fire transducer view can be oriented pointing away from oncoming traffic.

As depicted, approach 102 includes lanes 118, 119, and 120. Thus, FIG. 1 depicts three lanes of through-movement flow approaching stop bar 103. The forward-fire transducer view 104 automatically groups vehicles in all three lanes together and does not distinguish detection on a lane-by-lane basis.

In some embodiments, sensor system 100 is configured to automatically detect a distance from stop bar 103 to sensor system 100. A distance from stop bar 103 to sensor system 100 can determined by monitoring distances from sensor system 100 to where vehicles stop. The distance from stop bar 103 to a sensor system 100 is used to estimate the position of detected vehicles in relation to stop bar 103. In other embodiments, a distance from stop bar 103 to sensor system 100 is entered manually by an installer via a configuration utility. This configuration utility can be operated on site or remotely as part of a traffic management system.

The configuration utility can be used to set upper and lower arrival time bounds. The configuration utility can also be used to set a desirable headway time between vehicles, a desirable rate of vehicle flow, a ratio indicating a desirable level of capacity usage as a ratio or percentage, a desirable time gap between vehicles, and a (potentially dynamically adaptable) count threshold.

In one embodiment of the invention, an eighty-fifth percentile velocity of vehicles that do not decelerate or accelerate along approach 102 is used to automatically determine the fixed location of a passage point detector. The fixed point detector is used to estimate lagging time headway at the location of the detector in order to estimate capacity usage and protect a dilemma zone.

Another embodiment of the invention uses the velocity of vehicles monitored by a detector (e.g., 109) that covers a broad span of distances (e.g. 110) to dynamically adjust the location of a point detector. This embodiment overcomes the limitations of a fixed location point detector.

Another embodiment of the invention uses the velocity of vehicles monitored by a detector (e.g., 109) to dynamically adjust the acceptable location or length of distance headways within the detector's broad span of distances (e.g., 110) that qualify for indicating a specific level of capacity usage and dilemma zone protection. This embodiment overcomes the limitations of a fixed location point detector and the limitations of mechanisms that require passage time.

Another embodiment of the invention uses the estimated time-of-arrival of vehicles to stop bar 103 monitored by a detector (e.g., 109) to dynamically adjust the acceptable location and length of distance headways within the detector's broad span of distances (e.g., 110) that qualify for indicating a level of capacity usage and dilemma zone protection. This embodiment overcomes the limitations of a fixed location point detector and the limitations of mechanisms that require passage time. In addition, this method predicts the duration of future time headways at stop bar 103 and can be used to increase the effective green time of the intersection 152.

Data from sensor system 100 can be communicated to traffic control interface 115 over a communication link 114. Traffic control interface 115 provides an interface to traffic controller 113 (e.g., in traffic cabinet 116) for signalized intersection 152. The data sent over the communication link can indicate when the estimated level of efficiency and safety meet specific criteria.

Figure 1B:
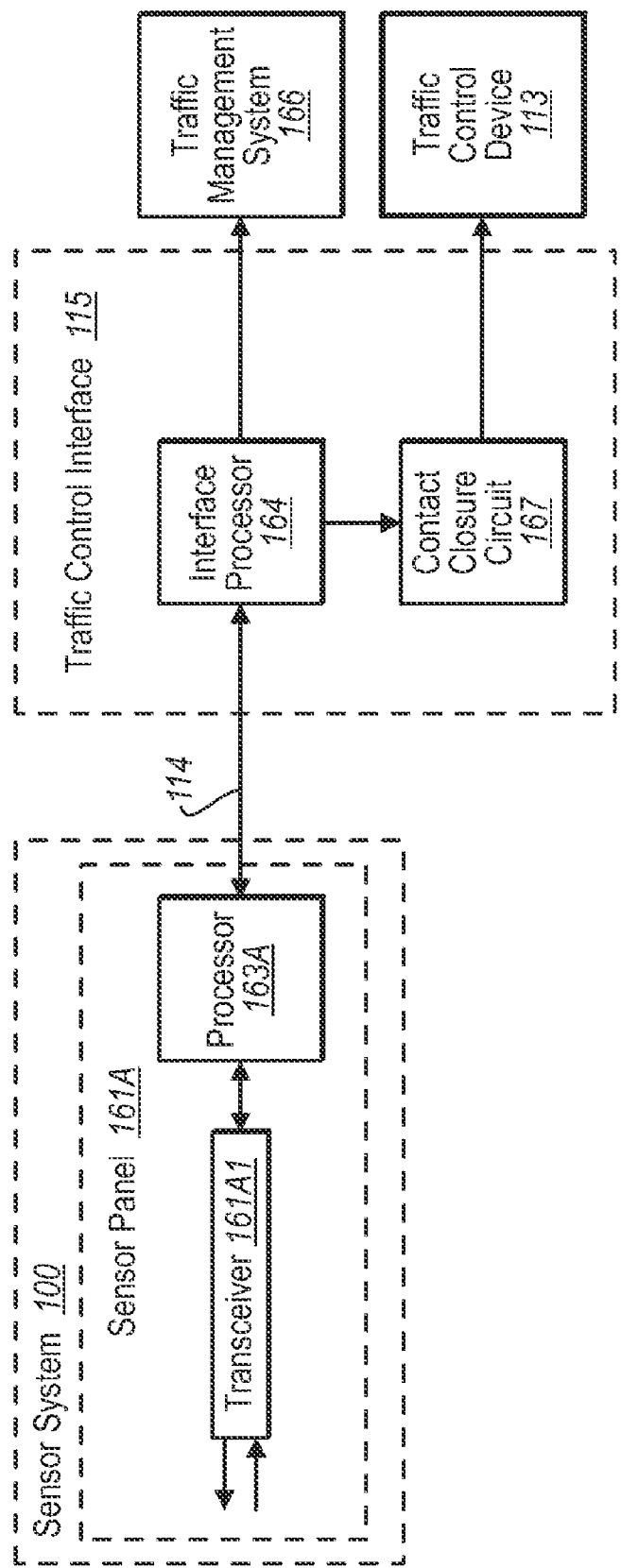
FIG. 1B illustrates a block diagram of some of the components of the traffic monitoring system depicted in FIG. 1A.

FIG. 1B illustrates a block diagram of some of the components of the traffic monitoring system depicted in FIG. 1A. As depicted in FIG. 1B, sensor system 100 includes a single sensor panel 161A. Sensor panel 161A includes one transceiver and a processor for configuring transmissions and processing reflections.

The transceiver 161A1 of sensor system 100 can transmit electromagnetic wave fronts and receive reflected waves (e.g., 108A through 108C) for transducer view 104. A transmitted electromagnetic wave front is of known power level. A transceiver works in concert with a corresponding processor to measure the power of a reflected wave indicative of the presence of vehicles passing within a transducer view. For example, transceiver 161A1 interoperates with processor 163A to measure the power of a reflected wave indicative of a vehicle passing through transducer view 104. Transceiver 161A1 can include a radar, such as, for example, an FMCW radar.

Processor 163A can transfer data corresponding to processed reflected waves to other components relevant to signalized intersection 152. For example, processor 163A can transfer processed data to traffic control interface 115. As depicted in FIG. 1B, traffic control interface 115 includes interface processor 164 and contact closure circuit 167. Interface processor 164 can receive processed data from processor 163A of sensor panel 161A. For example, interface processor 164 can receive processed data, corresponding to a level of efficiency and safety monitored by a detector (e.g. 109). Interface processor 164 can receive processed data to communicate to other components, such as, for example, traffic control device 113 and a traffic management system 166. An interface to a traffic control device 113 can be a contact closure circuit 167 or a serial communication link. A traffic management system 166 can include a configuration utility with the ability to view traffic data.

Figure 2:
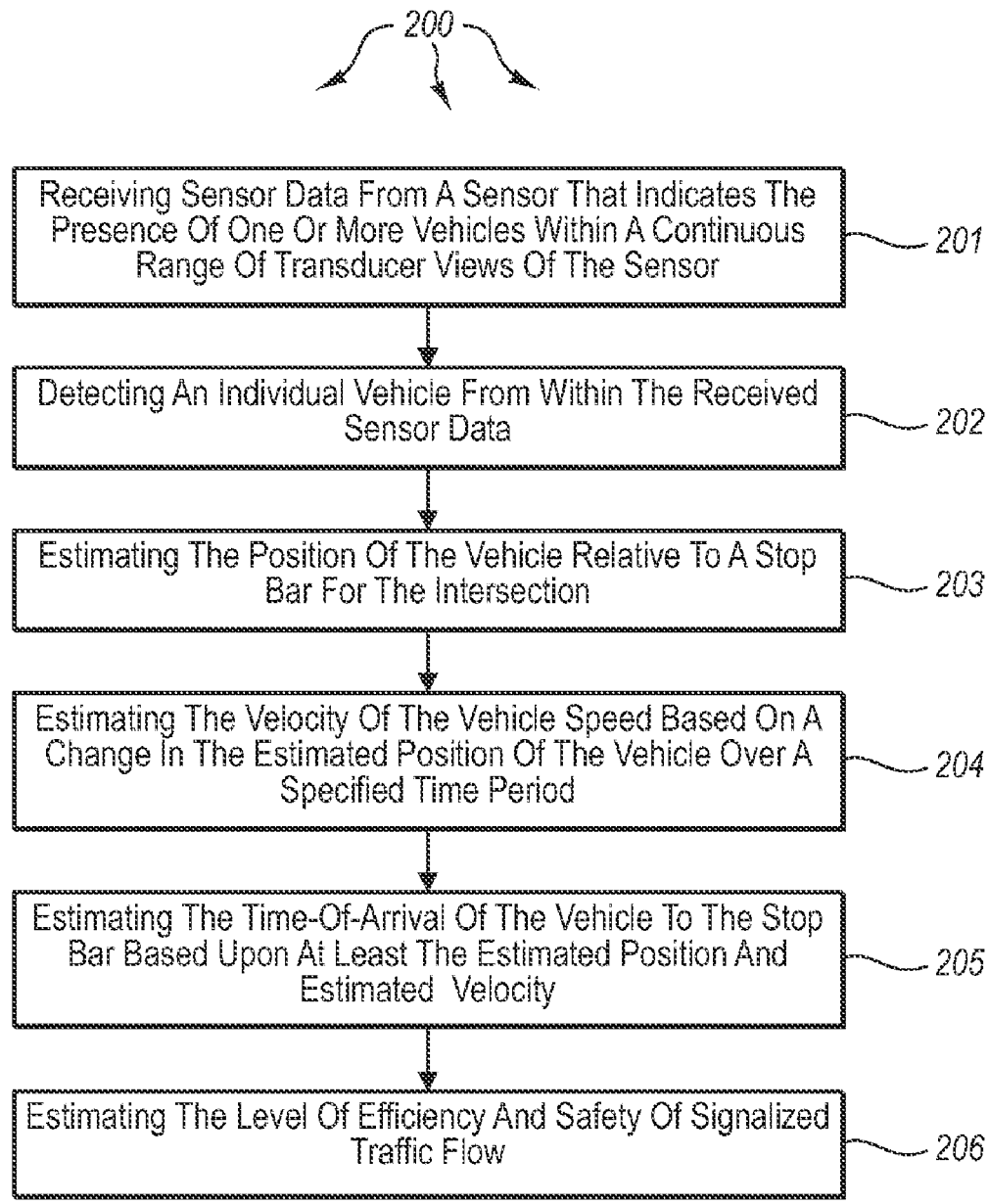
FIG. 2 illustrates a flow chart of an example method for monitoring signalized traffic flow as depicted in FIGS. 1A and 1B.

FIG. 2 illustrates a flow chart of an example method 200 for monitoring signalized traffic flow. Method 200 will be described with respect to the components in FIGS. 1A and 1B. Method 200 includes a method of monitoring signalized traffic flow occurring through interoperation between processors, such as, for example, between processor 163A and an interface processor 164.

Method 200 includes an act of receiving sensor data from a sensor that indicates the presence of one or more vehicles within a continuous range of a transducer view of the sensor (act 201). For example, processor 163A can receive transceiver data from transceiver 161A1 of sensor panel 161A that indicates the presence of a vehicle within transducer view 104. A continuous range can include one or more lanes within an extent of a dilemma zone, an extent of an early warning zone, or an extent of a clearing zone.

Method 200 includes an act of detecting an individual vehicle from within the received sensor data (act 202). For example, processor 163A can process the received transceiver data to detect that vehicle 151C is in transducer view 104. A Fourier transform can be used to convert time domain transceiver data into a frequency domain. A magnitude of each Fourier transform indicates an amount of energy contained in a received signal at a particular frequency, since with a frequency-modulated continuous wave system, distance is proportional to frequency. Thus, a Fourier transform magnitude represents an amount of energy received versus distance. Vehicles reflect much more energy than a road or a surrounding background, and therefore, their bright reflections can show up as a large spike in a magnitude of a Fourier transform. A detection threshold is set and when a Fourier transform magnitude exceeds a threshold, vehicle detection occurs.

Method 200 includes an act of estimating the position of the vehicle relative to a stop bar for the intersection (act 203). For example, processor 163A can estimate the position of vehicle 151C relative to stop bar 103. Processor 163A can the use the estimated position for identification. If a vehicle's position does not closely match an expected position of all vehicles already discovered by a sensor system 100, then a new vehicle has been discovered. A newly discovered vehicle is given a unique identifier for tracking hereafter. If a vehicle's position does match an expected position of a vehicle already discovered by a sensor system 100, then an observed position is used.

Method 200 includes an act of estimating the velocity of the vehicle based on a change in the estimated position of the vehicle over a specified time period (act 204). For example, processor 163A can estimate the velocity of vehicle 151C based on the change in position of vehicle 151C over a specified time period.

Method 200 includes an act of estimating the time-of-arrival to the stop bar based upon the estimated position and estimated velocity (act 205). For example, processor 163A can estimate the time vehicle 151C will arrive at stop bar 103 by dividing the estimate position of 151C by the estimated velocity of 151C. Alternately, processor 163A can estimate the time a vehicle will arrive at other points of interest, such as, for example, a crosswalk, a termination of an approach to an intersection, a location of a warning flasher, a location of variable message sign, and a traffic control sign.

Method 200 includes an act of estimating the level of efficiency and safety within signalized traffic flow (act 206). For example, processor 163A can estimate the level of efficiency and safety within traffic flow based upon the estimated time-of-arrival of vehicles 151C and 151B to stop bar 103. Processor 163A can estimate the level of efficiency and safety within traffic flow on a per lane basis.

In some embodiments, processor 163A can estimate the time-of-arrival to stop bar 103 for each vehicle by implementing a process that uses the estimated position, velocity, acceleration, and time headway of all detected vehicles within transducer view 104 to model traffic flow based upon car following behavior. Processor 163A can then use the estimated time-of-arrival, position, velocity, acceleration, and time headway to estimate the level of efficiency and safety within signalized traffic flow.

Figure 3:
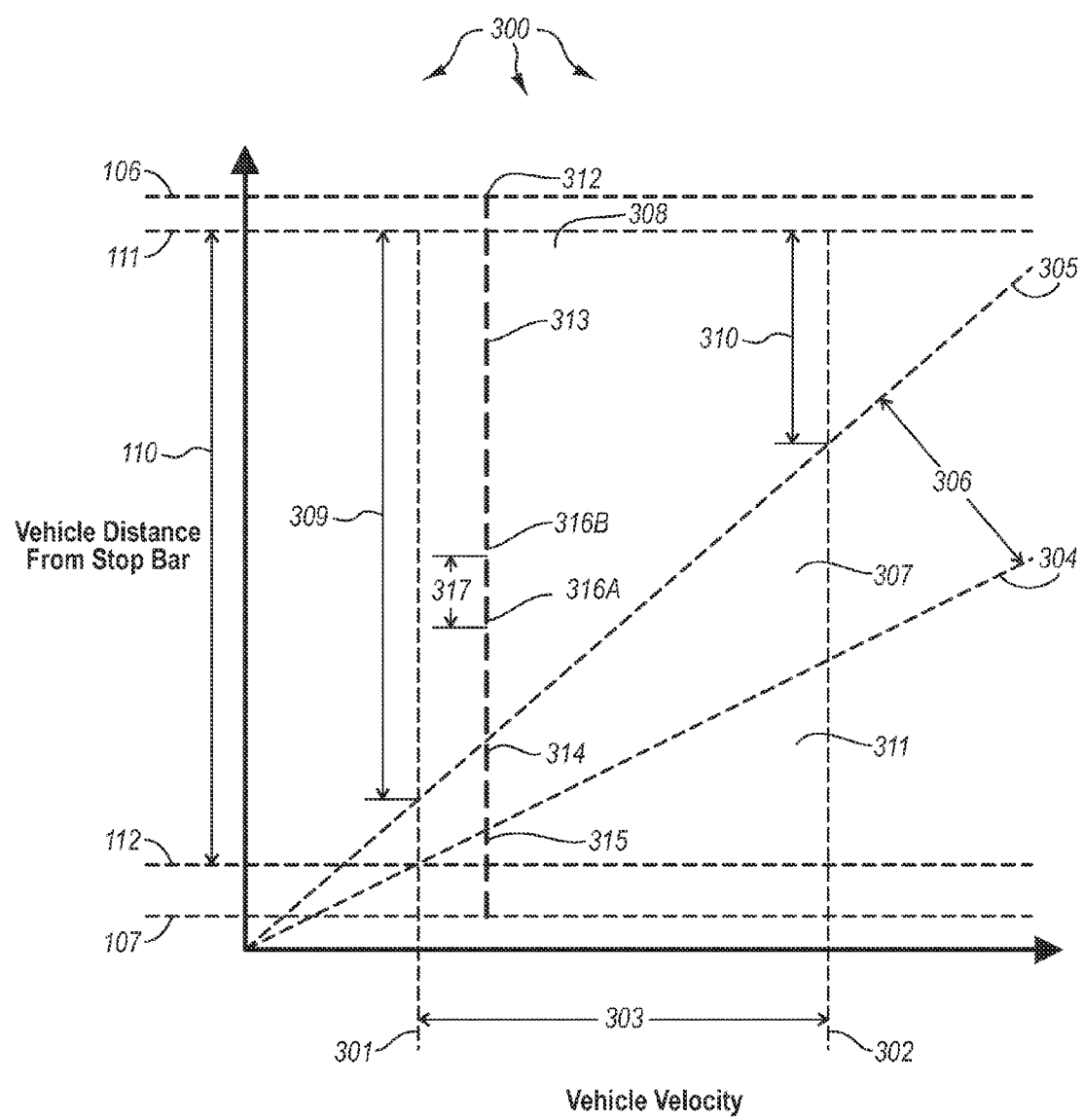
FIG. 3 illustrates a graph of parameters used to calculate a level of efficiency and safety within signalized traffic flow.

FIG. 3 illustrates a graph 300 of parameters used to calculate the level of efficiency and safety within signalized traffic flow. FIG. 3 will be described with frequent reference to items in FIGS. 1A, 1B, 8A, and 8B. On the vertical axis, distance span 110 starts at upper distance bound 111 of detector 109 and extends to lower distance bound 112. On the horizontal axis, velocity span 303 starts at lower velocity bound 301 and ends at upper velocity bound 302. Span 306 (of arrival times to stop bar 103) starts at lower arrival time bound 304 and ends at upper arrival time bound 305. An overlapping of these three spans determines a dilemma zone 307 as determined by detector 109. FIG. 3 illustrates that by estimating distance, speed, and arrival time signalized traffic flow can be monitored precisely for efficiency and safety considerations.

Early warning zone 308 is upstream from dilemma zone 307 (i.e., further away from stop bar 103). A distance horizon and time horizon provided by early warning zone 308 of dilemma zone detector group 109 varies based upon the velocity of vehicles. Slow vehicles in early warning zone 308 are detected well in advance of reaching dilemma zone 307. In other words, a prediction model for sensor system 100 or 800 with detector 109 has a larger distance horizon 309 and time horizon for slow vehicles. Sensor system 100 or 800 with detector 109 can also have a fast-vehicle distance horizon 310 and fast-vehicle time horizon, however fast-vehicle horizons are inherently smaller. In order to achieve a large distance and time horizon for fast vehicles, early warning zone 308 can extend coverage over a broad continuous span of distances as wide as 1000 feet or more upstream (i.e., further away) from a stop bar 103, as depicted by sensor system 800 in FIG. 8.

Clearing zone 311 is downstream from dilemma zone 307 (i.e., closer to stop bar 103). Vehicles traveling in clearing zone 311 are essentially past dilemma zone 307. However, these vehicles can re-enter a dilemma zone 307 if they decelerate at a necessary rate.

FIG. 3 further depicts various detections of a vehicle (e.g., vehicle 151A) as it approaches stop bar 103 at a constant speed along approach 102. Movement of the vehicle is traced using a dashed line. Initial detection 312 of the vehicle can indicate that the vehicle is to travel through dilemma zone 307. Early detection 313 of the vehicle in early warning zone 308 indicates that the vehicle has not yet entered dilemma zone 307. However, subsequent core detection 314 does indicate that the vehicle did actually enter the dilemma zone 307. Furthermore, clearance detection 315 indicates that after some time the vehicle is no longer in dilemma zone 307.

In a further example, two vehicles (e.g., vehicles 151B and 151C) approach stop bar 103 at a constant speed along approach 102 in the same lane 119. Thus, the movement of each vehicle can be traced using the dashed line. Accordingly, each of detections 312, 313, 314, and 315 are applicable to both vehicles.

Both vehicles will travel through dilemma zone 307. One vehicle (e.g., vehicle 151C) is leading the other vehicle (e.g., vehicle 151B), and thus at a particular time the leading vehicle's location is indicated by an early detection 316A. At the same time, the following vehicle's location is indicated by an early detection 316B. If distance headway 317 is small the current level of efficiency and safety may be impacted even though neither vehicle is in dilemma zone 317.

Very slow or very fast vehicles detected outside of dilemma zone 307, clearing zone 311, and early warning zone 308 may never enter a dilemma zone 307. Slower traveling vehicles are likely to have enough time to stop, as long as they are following with a safe time headway. Faster traveling vehicles are usually traveling at unlawful speeds, and may be ignored so that their unlawful behavior does not adversely influence traffic signal operations. Otherwise, factoring these vehicles into the estimated level of safety and efficiency may actually reward speeding.

As implied by the depiction in FIG. 3 estimated time-of-arrival to a stop bar can be calculated as a formula of distance divided by speed for isolated non-accelerating vehicles. With the two-dimensional illustration in FIG. 3, arrival time may not appear to be an independent dimension of dilemma zone 307. However, estimated time-of-arrival can be viewed as a separate dimension on approaches, for example, with accelerating/decelerating vehicles and vehicles following one another. And in any event, estimating arrival time and then defining a dilemma zone with an upper arrival time bound 305 and a lower arrival time bound 304 is a user-friendly way of configuring a detector. In some embodiments of the invention, the upper arrival time 305 bound is determined by adding a desirable time headway to the lower arrival time bound 304. In this case the desirable time headway is represented by arrival time span 306. The desirable time headway can be entered as a time value, as a flow rate, or a percent of capacity usage during configuration of detector 109. Configuration of detector 109 can be performed using a configuration utility which is part of a traffic management system 166.

Figure 4:
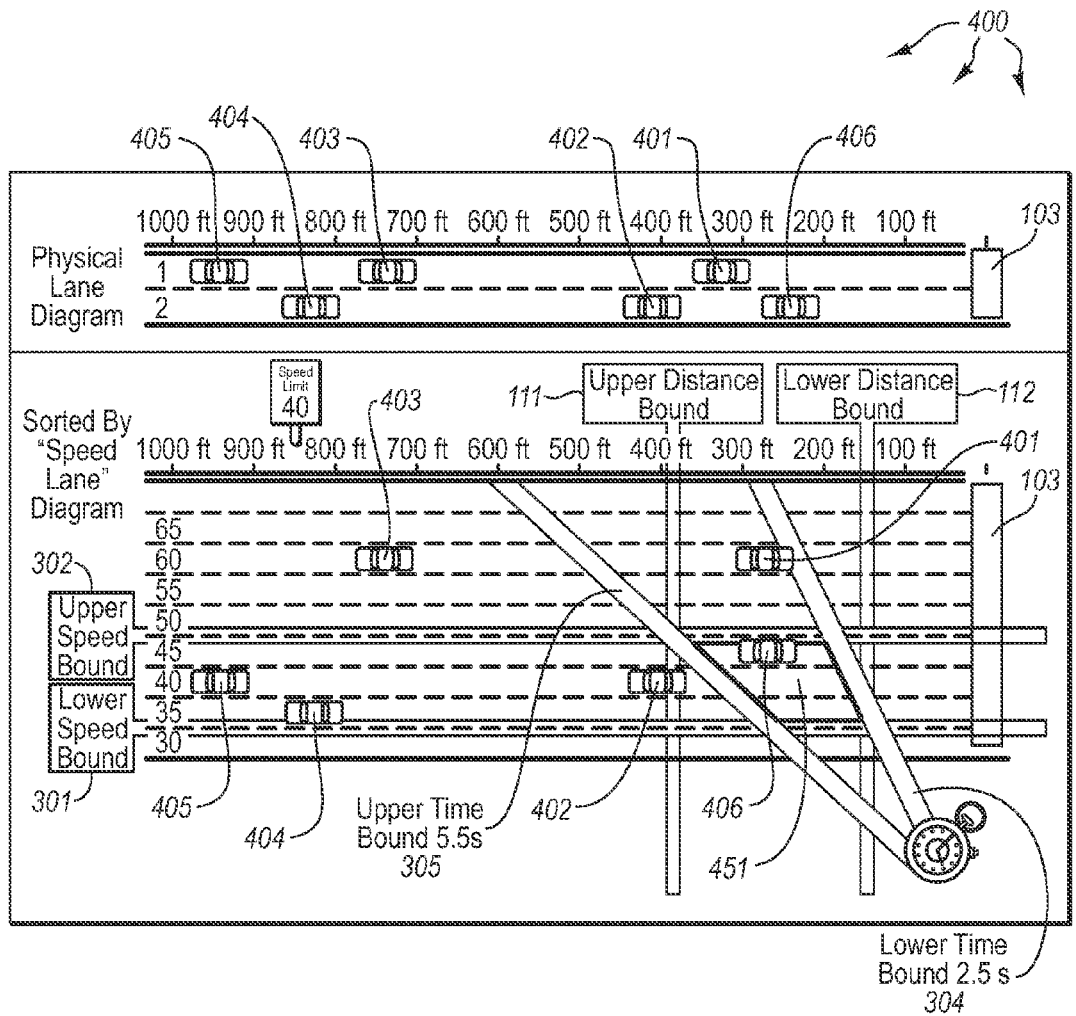
FIG. 4 illustrates a two-dimensional visualization of three-dimensional controls for a monitoring a dilemma zone.

FIG. 4 illustrates a two-dimensional visualization 400 of three-dimensional controls for a dilemma zone. As depicted in two-dimensional visualization 400, a number of vehicles 401 through 406 are approaching stop bar 407. Within two-dimensional visualization 400, the arrival time dimension appears on top of the speed and distance dimensions. For each dimension, controls set the upper and lower bound of the dilemma zone.

Upper and lower distance bounds 111 and 112 bound the distance dimension for dilemma zone 451. Upper and lower speed bounds 302 and 301 bound the speed dimension for dilemma zone 451. Upper and lower time bounds 305 and 304 bound the arrival time dimension for dilemma zone 451. Thus, the three-dimensional interior of these six boundaries define dilemma zone 451 (shaped as a polygon).

The present invention can include configuring one or more detectors for capacity usage detection and dilemma zone protection. A detector can be configured in at least three dimensions relevant to efficiency and safety: distance, speed, and arrival time. The configuration is accomplished using controls that set the upper and lower bounds for each dimension. These controls allow customization of the detectors of the sensor to estimate different levels of efficiency and safety. These controls can be adjusted using a configuration utility.

Figure 5:
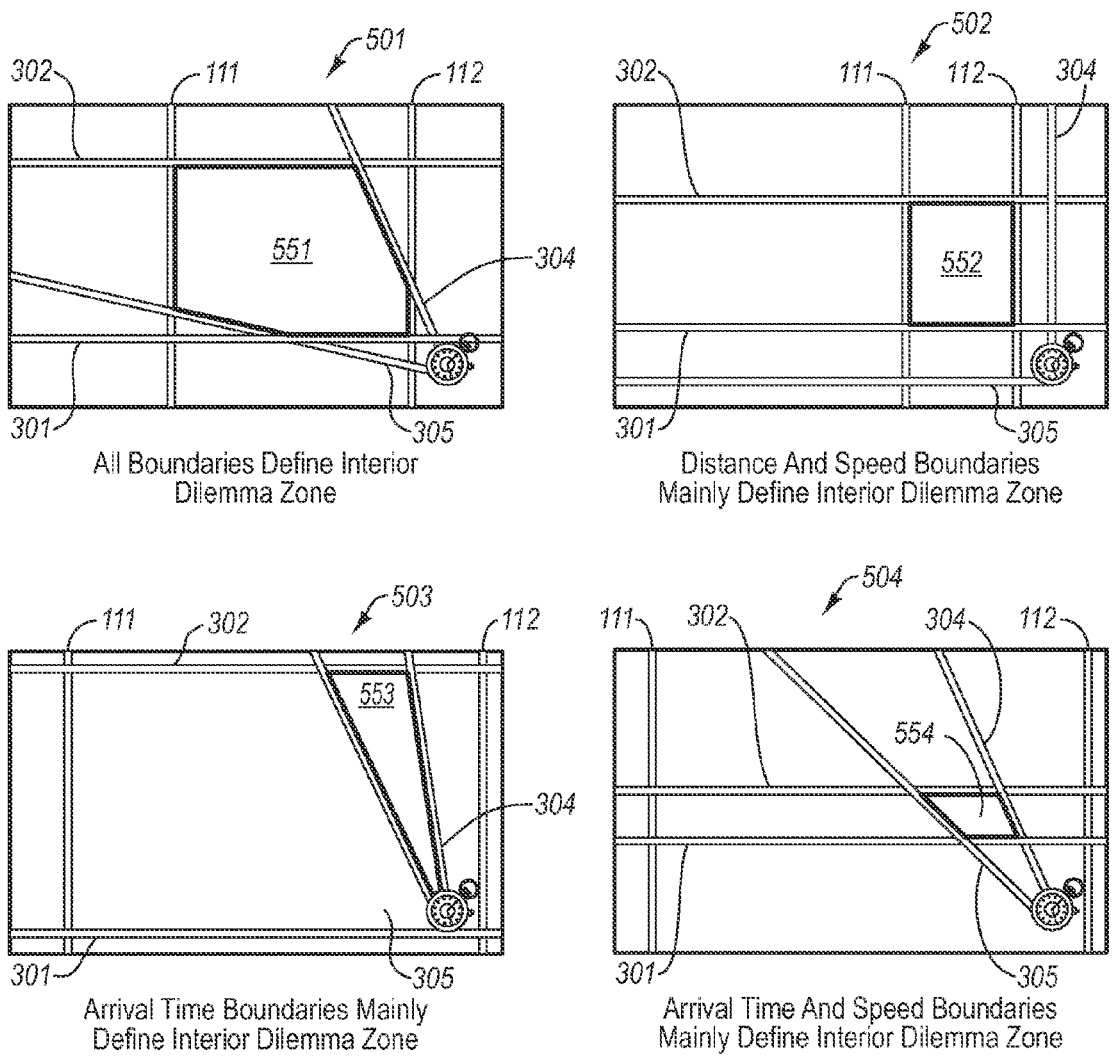
FIG. 5 illustrates examples of setting controls for different dimensions of a dilemma zone.

FIG. 5 illustrates examples 501, 502, 503, and 504 of setting controls for different dimensions of a dilemma zone. Within each of the examples 501, 502, 503, and 504, a dilemma zone is bounded by a thicker dark line in at least two of the three dimensions: distance to stop bar, speed, and arrival time. Upper distance bound 111 and lower distance bound 112 are used to bound distance. Upper speed bound 302 and lower speed bound 301 are used to bound speed. Upper arrival time bound 305 and lower arrival time bound 304 are used to bound arrival time.

As depicted in example 501, all three boundaries define the interior of dilemma zone 551. In example 502, distance and speed boundaries primarily define the interior of dilemma zone 552. In example 503, arrival time boundaries primarily define the interior of dilemma zone 553. In example 504, arrival time and speed boundaries primarily define the interior of dilemma zone 554.

Figure 6:
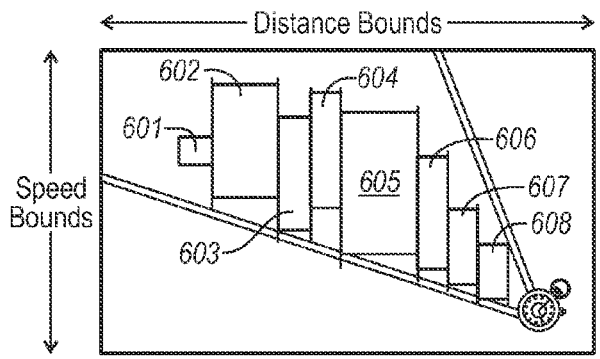
FIG. 6 illustrates an example of a detector group equivalent to a single detector covering a continuous range.

It is also possible to use several detectors in one detector group to focus boundaries of a dilemma zone. As depicted in FIG. 6, eight separate detectors 601-608 each has the same upper and lower bound for arrival time. The speed and distance bounds are then used to narrow the dilemma zone. The bounds in FIG. 6 are used in such a way as to provide protection over a continuous span of distances. A group of detectors used to cover a continuous range is equivalent to one detector with additional controls. In other words, a detector group can also be used to monitor a level of efficiency and safety within signalized traffic flow.

Figure 7:
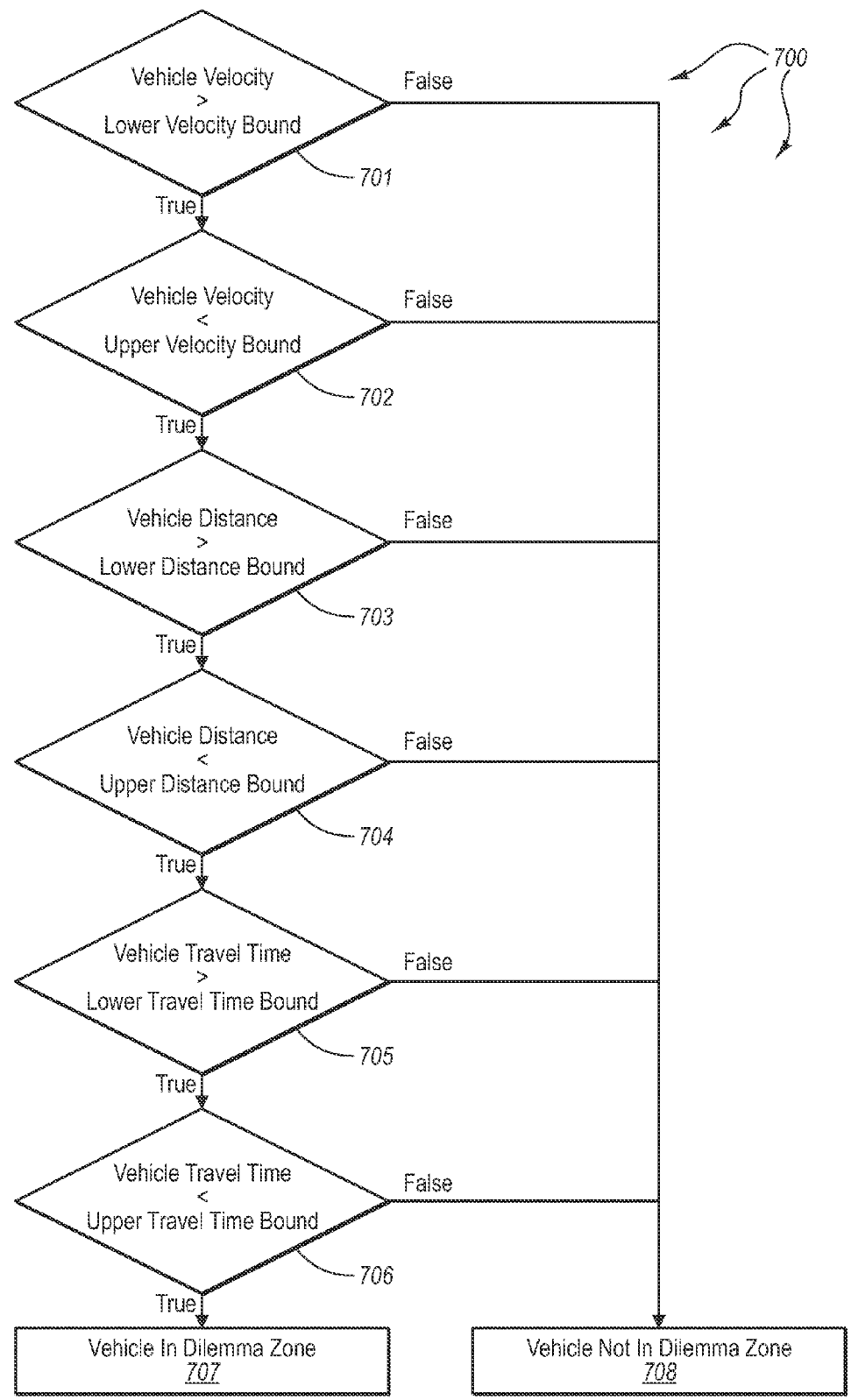
FIG. 7 illustrates a flow chart of an example method for determining if a vehicle is in a dilemma zone.

FIG. 7 illustrates a flow chart of an example method 700 for determining a level of efficiency and safety within signalized traffic flow. Method 7 can be executed at a sensor panel or traffic control interface to determine if a vehicle is in a dilemma zone, such as, for example, one of dilemma zones 451, 551, 552, 553, or 554. Accordingly, method 700 will be described with respect to the vehicles, bounds, and dilemma zone depicted in FIG. 4.

Method 700 includes an act of determining if a vehicle velocity is greater than a lower velocity bound (decision block 701). For example, a processor (e.g., in a sensor system or traffic control interface) can determine if the velocity of a vehicle approaching stop bar 103 is greater than lower speed bound 301. When vehicle velocity is greater than lower speed bound 301, for example, vehicles 401-406 (YES at decision block 701), control transitions to decision block 702. When vehicle velocity is not greater than lower speed bound 301 (NO at decision block 701), control transitions to act 708.

Method 700 includes an act of determining if a vehicle velocity is less than an upper velocity bound (decision block 702). For example, a processor (e.g., in a sensor system or traffic control interface) can determine if the velocity of a vehicle approaching stop bar 103 is less than upper speed bound 302. When vehicle velocity is less than upper speed bound 302, for example, vehicles 402, 404, 405, and 406 (YES at decision block 702), control transitions to decision block 703. When vehicle velocity is not less than upper speed bound 302, for example, vehicles 401 and 403 (NO at decision block 702), control transitions to act 708. Thus, vehicles 401 and 403 are determined not to be in dilemma zone 451.

Method 700 includes an act determining if a vehicle distance from a stop bar is greater than a lower distance bound (decision block 703). For example, a processor (e.g., in a sensor system or traffic control interface) can determine if the vehicle distance from stop bar 103 is greater than lower distance bound 112. When vehicle distance from stop bar 103 is greater than lower distance bound 112, for example, remaining vehicles 402, 404, 405, and 406 (YES at decision block 703), control transitions to decision block 704. When vehicle distance from stop bar 103 is not greater than lower distance bound 112 (NO at decision block 703), control transitions to act 708.

Method 700 includes an act of determining if a vehicle distance from a stop bar is less than an upper distance bound (decision block 704). For example, a processor (e.g., in a sensor system or traffic control interface) can determine if the vehicle distance from stop bar 103 is less than upper distance bound 111. When vehicle distance is less than upper distance bound 111, for example, remaining vehicles 402 and 406 (YES at decision block 704), control transitions to decision block 705. When vehicle distance is not less than upper distance bound 111, for example, remaining vehicles 404 and 405 (NO at decision block 704), control transitions to act 708. Thus, vehicles 404 and 405 are determined not to be in dilemma zone 451.

Method 700 includes an act of determining if a vehicle arrival time to a stop bar is greater than a lower time bound (decision block 705). For example, a processor (e.g., in a sensor system or traffic control interface) can determine if the vehicle arrival time to stop bar 103 is greater than lower time bound 304. When vehicle arrival time to stop bar 103 is greater than lower time bound 304, for example, remaining vehicles 402, and 406 (YES at decision block 705), control transitions to decision block 706. When vehicle arrival time to stop bar 103 is not greater than lower time bound 304 (NO at decision block 705), control transitions to act 708.

Method 700 includes an act of determining if a vehicle arrival time to a stop bar is less than an upper time bound (decision block 706). For example, a processor (e.g., in a sensor system or traffic control interface) can determine if the vehicles distance from stop bar 103 is less than upper time bound 305. When vehicle arrival time is less than upper time bound 305, for example, remaining vehicle 406 (YES at decision block 706), control transitions to act 707. Thus, vehicle 406 is determined to be in dilemma zone 451. When vehicle arrival time is not less than upper time bound 305, for example, remaining vehicle 402 (NO at decision block 704), control transitions to act 708. Thus, vehicle 402 is determined not to be in dilemma zone 751.

A compensation factor can be set that adjusts the estimated time-of-arrival by a percentage before comparison to the upper arrival time bound and the lower arrival time bound.

Method 700 includes act of determining that a vehicle is in a dilemma zone (act 707). For example, based on satisfying the bounds in decision blocks 701 through 706, a processor (e.g., in a sensor system or traffic control interface) can determine that vehicle 406 is in dilemma zone 451. Method 700 includes an act of determining that a vehicle is not in a dilemma zone (act 708). For example, based on not satisfying one of the bounds in decision blocks 701 through 706, a processor (e.g., in a sensor system or traffic control interface) can determine that vehicles 401-405 are not in dilemma zone 451.

FIG. 8 illustrates a traffic monitoring system 850 monitoring a portion of roadway approach 102 approaching stop bar 103 (the stop bar for signalized intersection 152). Within traffic monitor system 850, sensor system 800 (mounted on pole 801) provides a plurality of transducer views 804A through 804O of approach 102. Sensor system 800 can provide coverage of a broad continuous span of arrival times to stop bar 103, velocities, and distances within span of distance 105 along an approach 102 that are useful for monitoring the level of efficiency and safety within signalized traffic flow.

Transmitters and/or transceivers in sensor system 800 can transmit an electromagnetic wave front of known power across transducer views 804A through 804O. Thus, vehicles approaching stop bar 103 (e.g., vehicles 851A through 851E) pass view entry point 106, after which the vehicles are continuously monitored across span (of distance) 105, until the vehicles pass view exit point 107 (some distance past stop bar 103). Across span 105, vehicles reflect any transmitted wave front, at a reflected power level, back to receivers and/or transceivers in sensor system 800. Reflected signals depicted as reflected waves 808A through 808E are thereafter processed by components of sensor system 800. A power level of a reflected wave 808 indicates existence of vehicles.

Within span 105, the transducer views 804A through 804O can also define a detector 109. After entering the view of transducer views 104 (i.e., passing entry point 106), a vehicle subsequently passes upper distance bound 111 of detector 109, after which the vehicles are continuously monitored across span (of distance) 110, until the vehicles pass upper distance bound 112. Thus, within detector 109, components of sensor system 800 monitor vehicles over span 110 approaching stop bar 103 and within the width of an approach 102.

Accordingly, sensor system 800 can be configured to monitor, on a per vehicle basis, an arrival time to reach stop bar 103, a velocity approaching stop bar 103, and, a distance from a stop bar 103. In some embodiments, detector 109 is equivalent to a group of individual detectors defined to continuously monitor a span of distances 110. Components of sensor system 800 can receive and process reflected waves 808 (e.g., reflected waves 808A through 808E) to determine when vehicles pass lower distance bound point 111 and upper distance bound 112. Components of sensor system 800 can also be configured to receive and process reflected waves to determine a progression of vehicles, velocities of vehicles, and stop bar arrival times of vehicles within span 110.

The discovery zone is defined as the distance span 117 between view entry point 106 and upper distance bound 111. The transmitter/receiver combination or transceiver transmitting and monitoring within transducer view 804A can use the discovery zone to determine existence and velocity of vehicles before they enter a detector 109. The transmitter/receiver combination or transceiver can be configured in essentially a forward-fire orientation, in order to determine existence and velocity of vehicles before they enter detector 109. A forward-fire orientation places a transducer view with a length of its view oriented primarily up and down the approach 102, and a width of its view across the width approach 102.

An active transducer view 804 oriented exactly parallel to an approach 102 is exactly forward-fire. Thus, the transmitter/receiver combinations or transceivers transmitting and monitoring within transducer views 804A and 804O, are essentially (while not exactly) in a forward-fire orientation.

Other transmitter/receiver combinations or transceivers transmitting and monitoring within transducer views 804B through 804N can be configured in a side-fire orientation. A side-fire orientation places a transducer view with a length of its view oriented primarily across the width of an approach 102, and a width of its view along the length of an approach 102. The transmitter/receiver combination or transceiver transmitting and monitoring within transducer view 804H is oriented exactly perpendicular to an approach 102 and is exactly side-fire. Other transmitter/receiver combinations or transceivers transmitting and monitoring within transducer view 804B through 804G and 804I through 804N are placed somewhere between a forward-fire and side-fire orientation.

As depicted, approach 102 includes lanes 118, 119, and 120. Thus, FIG. 8 depicts three lanes of through movement approaching stop bar 103. A lane and a length of each vehicle tracked by a sensor system 800 can be determined when the vehicle passes through transducer view 804B (e.g., the first transmitter/receiver combination or transceiver oriented in a side-fire orientation).

Data from sensor system 800 can be communicated to traffic control interface 815 over a communication link 814. Traffic control interface 815 provides an interface to traffic controller 113 (e.g., in traffic cabinet 116) for signalized intersection 152. Traffic control interface 815 can also be configured to determine a level of safety and efficiency for detector 109.

Figure 8A:
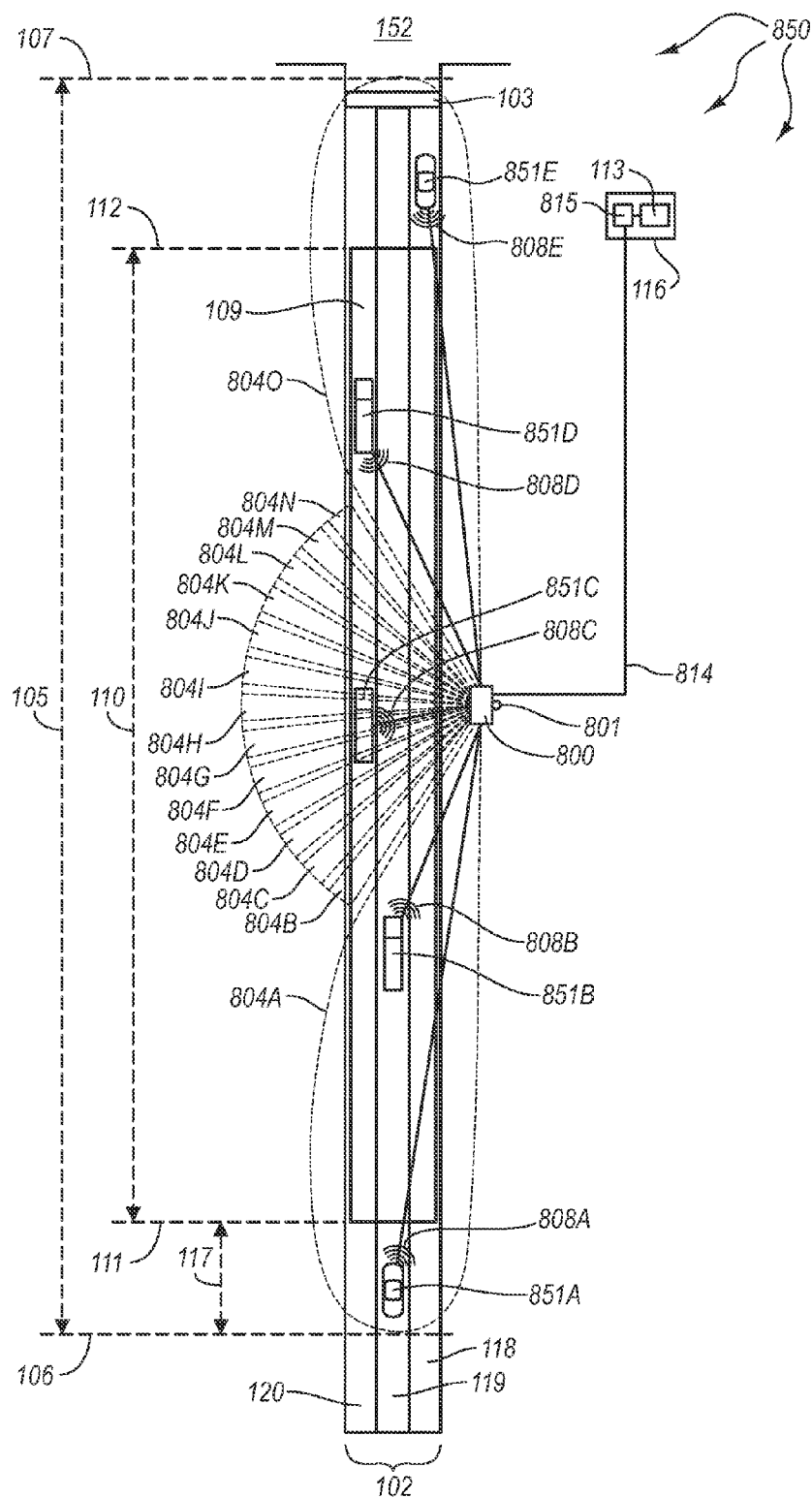
FIG. 8A illustrates a traffic monitoring system monitoring a portion of an approach to a stop bar on a lane-by-lane basis.
Figure 8B:
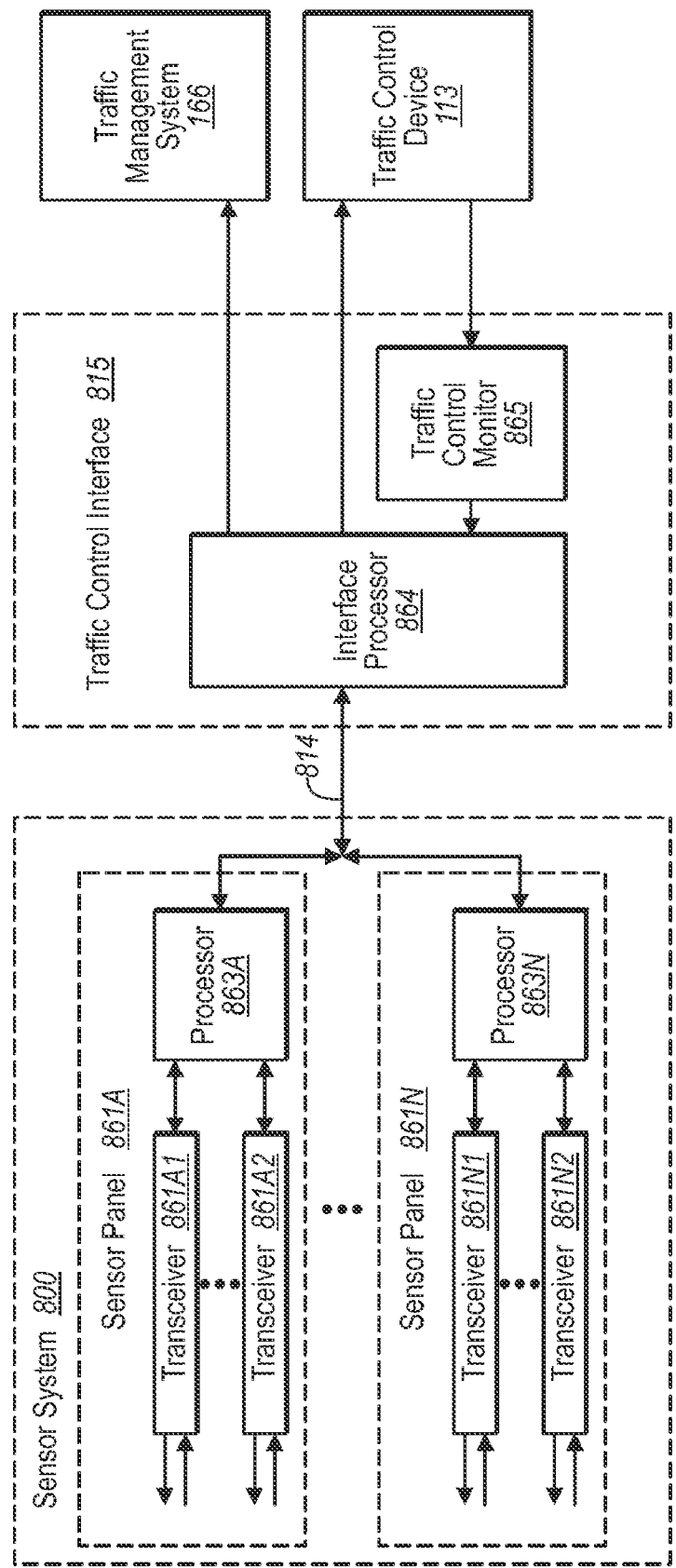
FIG. 8B illustrates a block diagram of some of the components of the traffic monitoring system depicted in FIG. 8A.

FIG. 8B illustrates a block diagram of some of the components of the traffic monitoring system depicted in FIG. 8A. As depicted in FIG. 8B, sensor system 800 includes multiple sensor panels 861A through 861N. A series of three vertical periods (a vertical ellipsis) indicates that additional sensor panels can be included between sensor panels 861A and 861N.

Each sensor panel can include one or more transceivers. For example, sensor panels 861A and 861N include transceivers 862A1 through 862A2 and transceivers 862N1 and 862N2 respectively. A series of three vertical periods (a vertical ellipsis) indicates that additional transceivers can be included between the depicted transceivers. Each transceiver also includes a processor for configuring transmissions and processing reflections. For example, sensor panels 861A and 861N include processors 863A and 863N respectively.

The transceivers of sensor system 800 can transmit electromagnetic wave fronts and receive reflected waves (e.g., 808A through 808E) for each transducer view 804A-804O. A transmitted electromagnetic wave front is of known power level. A transceiver works in concert with a corresponding processor to measure the power of a reflected wave indicative of the presence of vehicles passing through a transducer view. For example, it may be that transceiver 862A2 interoperates with processor 863A to measure the power of a reflected wave indicative of a vehicle passing through transducer view 804D.

Processors can transfer data corresponding to processed reflected waves to other components relevant to signalized intersection 152. For example, processor 863A can transfer processed data to traffic control interface 815. As depicted in FIG. 8B, traffic control interface 815 includes interface processor 864 and traffic control monitor 865. Interface processor 864 can receive processed data from sensors panel processors. For example, interface processor 864 can receive processed data, corresponding to the power of a reflected wave indicative of a vehicle passing through transducer view 804D, from processor 863A.

Interface processor 864 can further process received data to determine a level of efficiency and safety for detector 109. Interface processor 864 can indicate a level of efficiency and safety to other components, such as, for example, traffic control device 113 and a traffic management system 166. An interface to a traffic control device 113 can be a contact closure circuit or a serial communication link. A traffic management system 166 can include a configuration utility with the ability to view traffic data. Traffic control monitor 865 can also receive status information regarding control of traffic on an intersection, such as an active phase and the current status of the maximum green timer, back from a traffic control device 113. An interface processor 864 receives traffic control information from a traffic control monitor 865 and uses it to determine an optimal safety level for signalized intersection 152. Interface processor 864 can send time synchronization information back to sensor system 800.

Figure 9:
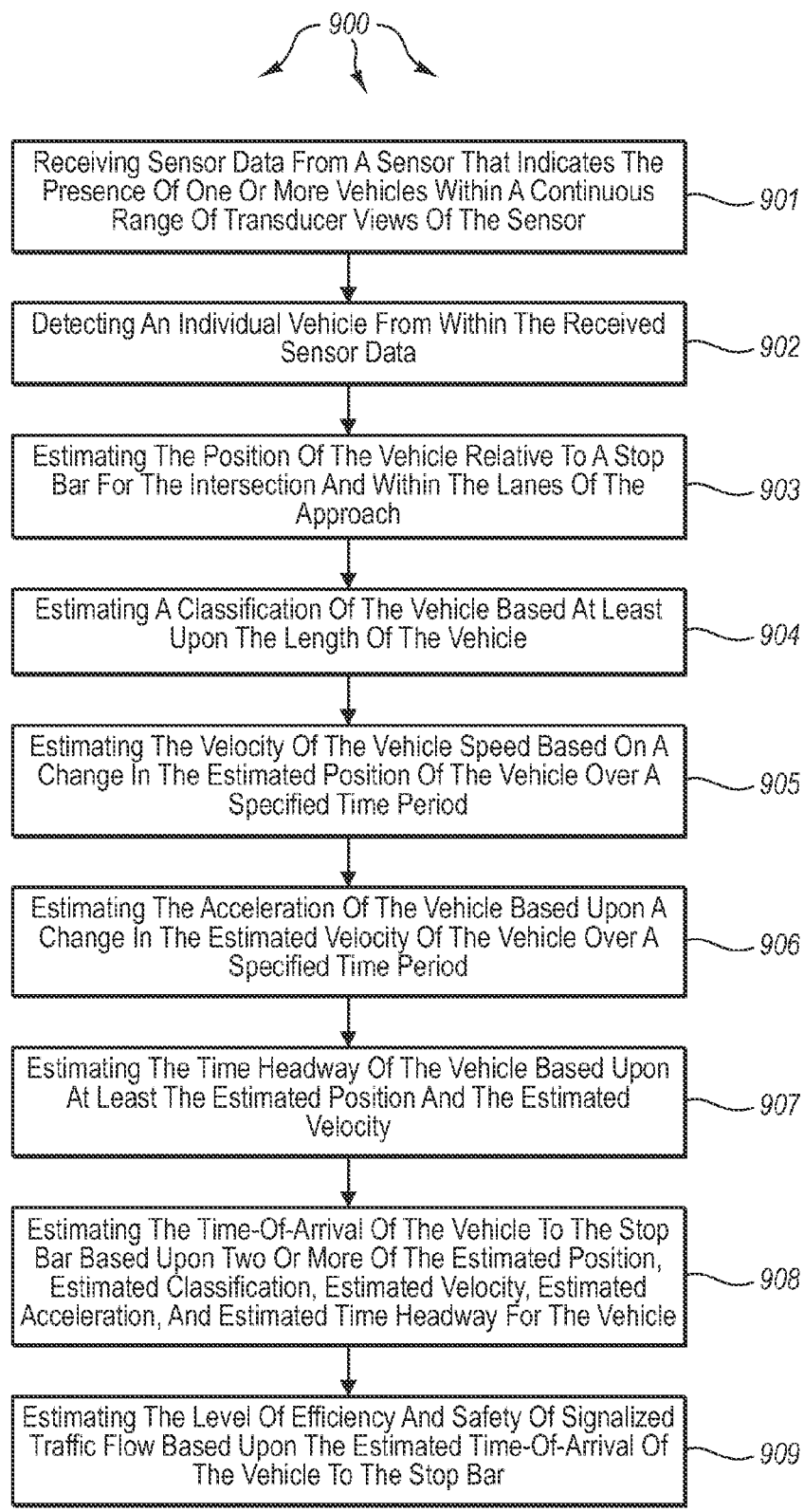
FIG. 9 illustrates a flow chart of an example method for monitoring signalized traffic flow as depicted in FIGS. 8A and 8B.

FIG. 9 illustrates a flow chart of an example method 900 for monitoring signalized traffic flow. Method 900 will be described with respect to the components in FIGS. 8A and 8B. Method 900 includes a method of monitoring signalized traffic flow occurring through interoperation between processors, such as, for example, between processor 863A and an interface processor 864.

Method 900 includes an act of receiving sensor data from a sensor that indicates the presence of one or more vehicles within a continuous range of transducer views of the sensor (act 901). For example, processor 863A can receive transceiver data from transceivers of sensor panel 861A that indicates the presence of a vehicle within transducer views 804H, 804G, 804F and 804E.

Method 900 includes an act of detecting an individual vehicle from within the received sensor data (act 902). For example, processor 863A can process the received transceiver data to detect that vehicle 851C is the vehicle in transducer views 804H, 804G, 804F and 804E. A Fourier transform can be used to convert time domain transceiver data into a frequency domain. A magnitude of each Fourier transform indicates an amount of energy contained in a received signal at a particular frequency, since with a frequency-modulated continuous wave system, distance is proportional to frequency. Thus, a Fourier transform magnitude represents an amount of energy received versus distance. Vehicles reflect much more energy than a road or a surrounding background, and therefore, their bright reflections can show up as a large spike in a magnitude of a Fourier transform. A detection threshold is set and when a Fourier transform magnitude exceeds a threshold, vehicle detection occurs.

Method 900 includes an act of estimating the position of the vehicle relative to a stop bar for the intersection and the lane position (act 903). For example, processor 863A can estimate the position of vehicle 851C relative to stop bar 103. However, the relative position of vehicles detected in any of the transducer views can be estimated.

Thus, positions of vehicles detected by active transducer views 804A and 804O oriented in a forward-fire fashion indicate position upstream or downstream of where a sensor system 800 is mounted along an approach 102. These positions can be recorded in terms of distance to a stop bar 103 and distance headway between vehicles. Positions of vehicles detected by active transducer views 804B-804N oriented in the side-fire fashion indicate position in a particular lane of an approach 102 at a distance of a sensor system 800 from a stop bar 103. By using a series of active transducer views 804 from a forward-fire to a side-fire orientation, a two-dimensional view of approach 102 can be created.

Method 900 includes an act of estimating a classification of the vehicle based at least upon the length of the vehicle (act 904). For example, processor 863A can estimate a classification for vehicle 851C based at least upon the length of vehicle 851C.

Upon detecting a vehicles position along approach 102, the vehicle's classification can then be determined. A vehicle's classification can be detected based upon a brightness of received energy within an active transducer view 804. For example, the classification of vehicle 851C can be detected based upon a brightness of received energy within transducer views 804. A vehicle's classification can be further detected based upon a length of a vehicle detected with one or more active transducer views 804 mounted in a side-fire orientation. For example, the length of vehicle 851C can be determined, at least in part, by the number of side-fire transducer views 804 vehicle 851C is simultaneously detected in as it passes sensor system 800.

If multiple transducer views 804B-804N arranged in a horizontal fan beam are used, a length can be detected based upon an angular extent of a vehicle appearing simultaneously in multiple active transducer views 804B-804N (e.g., 804E through 804H). A vehicle's classification can further be detected based upon a height of a vehicle with one or more active transducer views 804 mounted in a vertical fan fashion similar to a horizontal fan fashion shown in FIG. 8A. This creates a third dimension to a view of an approach 102. If only one active transducer view 804 is mounted for height detection, it can be mounted to only detect tall vehicles. If only one active transducer view 804 is mounted for length detection, a prior velocity estimate made in act 905 for the same vehicle can be used in conjunction with an estimate of the duration of the vehicle within an active transducer view 804 to detect a length.

In some embodiments, upon detection of a vehicle's classification, a vehicle's identification is then determined based on the vehicle's position. If a vehicle's position does not closely match an expected position of all vehicles already discovered by a sensor system 800, then a new vehicle has been discovered. A newly discovered vehicle is given a unique identifier for tracking hereafter. If a vehicle's position does match an expected position of a vehicle already discovered by a sensor system 800, then an observed position is used.

Method 900 includes an act of estimating the velocity of the vehicle based on a change in the estimated position of the vehicle over a specified time period (act 905). For example, processor 863A can estimate the velocity of vehicle 851C based on the change in position of vehicle 851C over a specified time period. In some embodiments, the estimated velocity is used to refine the position estimate to correct for Doppler ambiguity. Method 900 includes an act of estimating the acceleration of the vehicle based on a change in the estimated velocity of the vehicle over the specified time (act 906). For example, processor 863A can estimate the acceleration of vehicle 851C based on the change in velocity of vehicle 851C over a specified time period.

Method 900 includes an act of estimating the time headway of a vehicle based upon: the time elapsed since arrival of the last vehicle at a fixed point within the detection zone, the estimated position of the current vehicle in relation to a fixed point within the detection zone, and the estimated velocity of the current vehicle (act 907). For example, processor 863A can estimate the time headway of vehicles with the same lane position. In this case, the time headway of vehicle 851C can be estimated by determining the relative position of vehicle 851C to a fixed point within the view of the transceivers 861A1-861A2. Processor 863A can also keep track of the time elapsed since the front extent of vehicle 851D arrived at this fixed point. Then to estimate the time headway of vehicle 851C, the relative position can be divided by the estimated velocity of vehicle 851C and added to the elapsed time since passage of vehicle 851D.

Method 900 includes an act of predicting a time the vehicle will reach the stop bar based upon two or more of the estimated position, estimated classification, estimated velocity, estimated time headway, and estimated acceleration for the vehicle (act 908). For example, processor 863A can predict a time that vehicle 851C will reach stop bar 103 based upon two or more of the estimated position, estimated classification, estimated speed, estimated time headway, and estimated acceleration for vehicle 851C. In some embodiments, upon detection of a vehicles' positions (e.g., relative to a stop bar 103, other vehicles, and lanes), classifications, identifications, velocities, accelerations, and headways can be input into a prediction model that estimates an arrival time to stop bar 103 for each vehicle.

Method 900 includes an act of estimating a level of efficiency and safety of signalized traffic flow based upon the estimated time-of-arrival of the vehicle to the stop bar 103 (act 909). For example, processor 863A can estimate a level of efficiency and safety of signalized traffic flow based on the estimated arrival time of vehicle 851C to stop bar 103.

Since the lane position of each vehicle is estimated, an embodiment of the invention uses the per lane velocity of vehicles monitored by a detector (e.g., 109) that covers a broad span of distances (e.g., 110) to dynamically adjust the location of a point detector within each lane. This embodiment overcomes the limitations of a fixed location point detector.

Another embodiment of the invention uses the lane position and velocity of vehicles monitored by a detector (e.g., 109) to dynamically adjust the acceptable location or length of distance headways within the detector's broad span of distances (e.g., 110) that qualify for indicating a specific level of capacity usage and dilemma zone protection on a lane-by-lane basis. This embodiment overcomes the limitations of a fixed location point detector and the limitations of mechanisms that require passage time.

Another embodiment of the invention uses the lane position and the estimated time-of-arrival of vehicles to stop bar 103 monitored by a detector (e.g., 109) to dynamically adjust the acceptable location and length of distance headways within the detector's broad span of distances (e.g., 110) that qualify for indicating a the level of capacity usage and dilemma zone protection on a lane-by-lane basis. This embodiment overcomes the limitations of a fixed location point detector and the limitations of mechanisms that require passage time. In addition, this method predicts the duration of future time headways at stop bar 103 on a lane-by-lane basis and can be used to increase the effective green time of the intersection 152. When a sizable time headway at the stop bar 103 is predicted for each through lane of approach 102, this will synchronize passage of the last vehicle in all lanes. This is equivalent to requiring simultaneous "gap out" of all lanes of a single approach, but it is done predicatively and on a lane-by-lane basis. This means that the location and length of distance headways may actually be different in each lane. In some embodiments, after some time only sequential "gap out" of all lanes may be required to prevent "max out".

Figure 10:
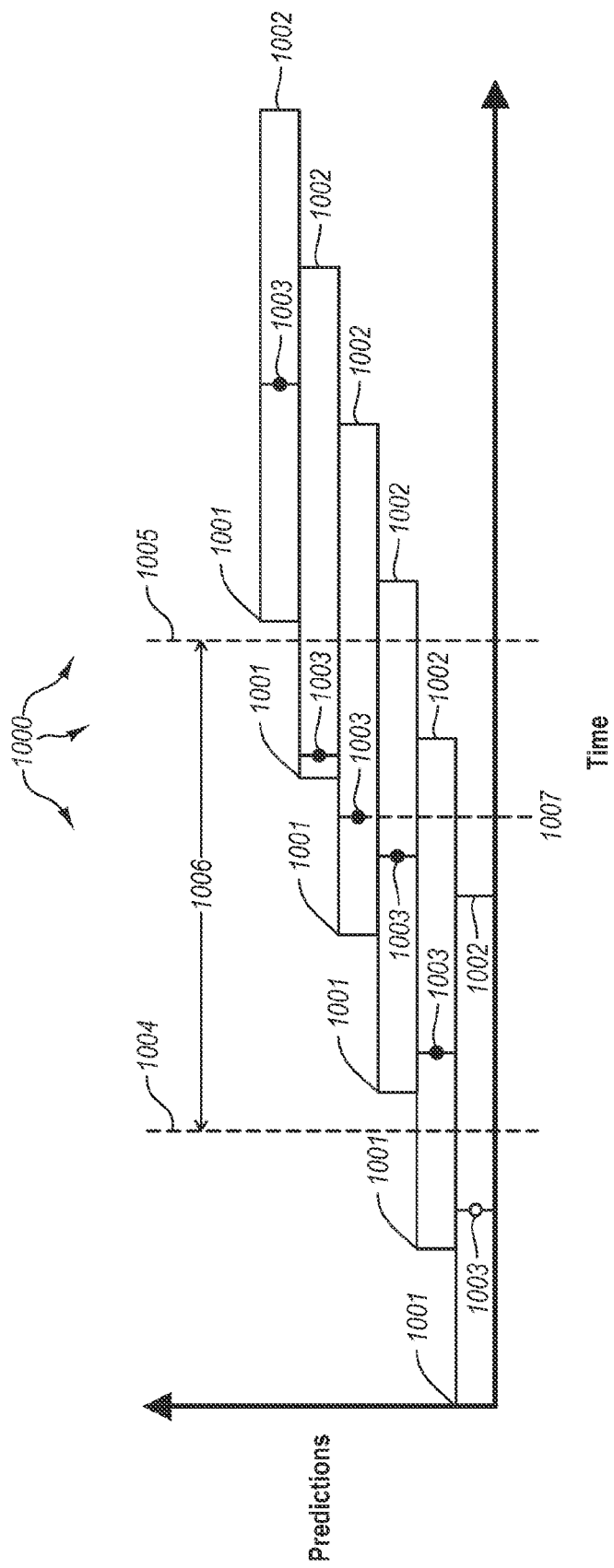
FIG. 10 illustrates a graph depicting how a current and a predicted future efficiency and safety level within signalized traffic flow can be used to select an optimal time for a green-to-amber transition.

FIG. 10 illustrates a graph 1000 depicting how a current and a predicted level of efficiency and safety can be used to determine a time at which a minimum level of efficiency and maximum level of safety will occur. For discussion of FIG. 10, current and predicted levels of efficiency and safety will be simply described as maximum levels of safety. FIG. 10 will be described with frequent reference to items in FIGS. 8A and 8B. Communication of a level of efficiency and safety to traffic controller 113 can be facilitated through traffic control interface 815 that provides a single contact closure. A contact closure can be asserted to indicate that a maximum level of safety that can be foreseen has not yet been reached. Estimations of current and predicted safety levels can be performed at specified time intervals.

A time horizon of a prediction starts at a current time 1001 when a prediction is made and extends to an end of a time horizon 1002. An optimal safety level in a current prediction is a maximum safety level in a time horizon. This optimal safety level 1003 is depicted by its location in time within a current prediction horizon.

FIG. 10 overlays prediction time horizons on top of a green extension time window 1006. The green extension time window 1006 is a time in which traffic controller 113 is considering ending active phases of traffic movement. A beginning of a green extension time window can be minimum green time 1004. An end of the green extension time window can be maximum green time 1005. Traffic controller 113 can signal a sensor system 800 indicating that a green light indication has started and the current value of the maximum green time. When no vehicles on conflicting movements are registered within the traffic control unit, the maximum green time 1005 can be indefinite At a green-to-amber transition time 1007, when an optimal safety level 1003 is reached before calculating a next safety level estimate within duration of the green extension time window 1006, a light will transition to an amber indication. An optimal safety level 1003 is further constrained to occur before a maximum green time 1005 occurs. This increases the likelihood of optimal safety level 1003 occurring earlier than or at maximum green time 1005.

As previously described, embodiments of the present invention include a method of monitoring signalized traffic flow to estimate a level of efficiency and safety. Estimation of the level of efficiency and safety can be done by detecting passage of a vehicle in a dilemma zone as configured by an installer. In its more general form, calculation of the level of efficiency and safety can incorporate other important elements like: time headway, velocity, acceleration, classification of vehicle, and lane position.

The level of efficiency and safety can be high or low. In one embodiment, a high level will indicate superior efficiency and minimal safety, and a low level will indicate minimal efficiency and superior safety. In this case, vehicles in a dilemma zone constrained by arrival time will increase the level of efficiency and safety. Also in this case, vehicles with short time headways can increase the level of efficiency and safety. Similarly, accelerating vehicles can increase the level of efficiency and safety. Vehicles traveling at velocities above the 85% speed can also increase the level of efficiency and safety. Larger classes of vehicles traveling quickly can increase the level of efficiency and safety. Vehicles that do not have an option to change lanes can increase the level of efficiency and safety.

The present invention can also include reporting the level of efficiency and safety to a traffic control device (e.g., traffic control device 113). Standards for traffic cabinet hardware provide detector rack slots for interfacing with detectors of sensors. These rack slots accept multiple detector inputs signaled using two-level values. In order to facilitate integration into standard traffic cabinets the current invention comprises the ability to report the level of efficiency and safety as a two-level value.

When the two-level value is sent to the controller it can signal to extend the green light when the high level of the two-level value is sent. Otherwise, when the low value of the two-level value is sent, the level will indicate a recommendation to stop extending the green light.

In the several of the following embodiments the level of efficiency and safety is reported instantaneously and does not require a count down timer within the controller.

In one embodiment, a level of efficiency and safety is encoded as the low level of the two levels when no vehicles are detected in the dilemma zone, in order to indicate minimal efficiency and superb safety. Otherwise, if there is at least one vehicle in the dilemma zone, then the level of efficiency and safety is encoded as the high level of the two levels, in order to indicate superb efficiency and minimal safety. This embodiment does not require the use of a count down timer within the traffic control unit to report the level of efficiency and safety, but rather the level of efficiency and safety can be reported instantaneously.

However, the control unit of the traffic signal system is the ultimate decision maker, and can relax the safety criteria and increase the efficiency requirements for green extension as the active traffic phase progress closer towards the maximum green limit. One way the traffic control unit can dynamically change its decision criteria over time is to use a count down timer to require that a specific level of efficiency and safety be present, for a specified period of time, before a green-to-amber transition can be executed. As the active phases progress towards the maximum green limit, the specified period of time can be shortened. With most standard traffic control units this can be done using the gap reduction feature.

With the present invention, a detector of the sensor system can be configured to monitor the roadway for a two-second arrival time gap. Then the traffic controller can use the gap reduction feature to initially require that the two-second arrival time gap (which represents a level of efficiency and safety) persist for an additional three seconds. Initially, this will essentially require that a five-second gap in traffic be detected before a green-to-amber can be executed. Then as the phase progresses towards the maximum green time, the required period of persistence can be shortened. For example, it could be reduced to zero seconds, meaning that the traffic controller is no longer requiring that the level of efficiency and safety persist, only that it exist. In this example, when the period of persistence is no longer required, the acceptable gap in traffic is shortened down to two-seconds.

The ability to increase the efficiency requirements and relax the safety criteria over time is not unique to the traffic controller, even though it is the ultimate decision maker. For example, in one embodiment the sensor system of the present invention can narrow the arrival time span between the upper arrival time bound and lower arrival time bound dynamically. This can be done based upon information regarding the status of the maximum green timer, or based upon progression of traffic flow.

In another embodiment, the level of efficiency and safety is encoded as the low level of the two levels to indicate that it represents the lowest level of efficiency and safety given the current prediction horizon. Otherwise, the level of safety and efficiency is encoded as the high level of the two levels.

In another embodiment, level of efficiency and safety is encoded as the low level of the two levels when it represents a level of efficiency and safety that exceeds a threshold of acceptability. Otherwise, the level of efficiency and safety is encoded as the high level of the two levels.

In another embodiment, the level of efficiency and safety is signaled using multiple detector contact closure channels to create a binary-encoded value. For, example detector channel 1 and channel 2 may both be signaled with a two-level value. If both channels are signaled with a high level then this can represent a binary-encoded 3. The binary-encoded 3 would indicate the highest of 4 levels. Whereas if both channels are signaled with a low level then this can represent a binary-encoded 0, which is the lowest of 4 levels.

Embodiments of the present invention can also be used to monitor signalized traffic flow in conjunction with an advance warning signal system. Here the controls that focus protection in the dimensions of arrival time, speed, and velocity can be used to monitor an early warning zone instead of a dilemma zone. Furthermore, the present invention can be used to predict the time-of-arrival of a vehicle to the stop bar after it has left the view of the sensor system, as well as during the period of time that it is in the sensor systems view. This additional prediction information can be used to estimate a level of efficiency and safety.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a roadway mounted sensor, the roadway mounted sensor monitoring vehicles on a portion of a roadway, a method for monitoring a signalized traffic flow, the method comprising:
   an act of receiving sensor data, the sensor data indicating the presence of one or more vehicles within a continuous range of the monitored portion of the roadway, the received sensor data representing a portion of a signal that was transmitted by the roadway sensor into the portion of the roadway;
   an act of using the received sensor data to determine estimated times-of-arrival of the one or more vehicles to a traffic control point associated with the monitored portion of the roadway, two or more times while the one or more vehicles are within the continuous range;
   an act of determining a level of efficiency and safety for the traffic flow within the vicinity of the traffic control point based upon the estimated times-of-arrival; and
   an act of reporting the level of efficiency and safety to a traffic control unit that is actively controlling the monitored signalized traffic flow.

2. The method as recited in claim 1, wherein the an act of using the received sensor data to determine estimated times-of-arrival of the one or more vehicles to a traffic control point associated with the monitored portion of the roadway comprises an act of determining estimated times-of-arrival to a traffic control point selected from among the following: a stop bar, a crosswalk, a termination of an approach into an intersection, a location of a warning flasher, a location of a variable message sign, and a traffic control sign.

3. The method as recited in claim 1, wherein the continuous range comprises at least one of the following: an extent of a dilemma zone, an extent of an early warning zone, and an extent of a clearing zone.

4. The method as recited in claim 1, wherein the continuous range comprises one or more lanes.

5. The method as recited in claim 4, wherein the act of determining the level of efficiency and safety comprises an act of estimating a per lane level of efficiency and safety.

6. The method as recited in claim 1, further comprising:
an act of comparing the estimated time-of-arrival to an upper arrival time bound; and
an act of comparing the estimated time-of-arrival to a lower arrival time bound.

7. The method as recited in claim 6, further comprising:
an act of setting the upper arrival time bound via a configuration utility; and
an act of setting the lower arrival time bound via a configuration utility.

8. The method as recited in claim 7, further comprising:
an act of setting the either the upper arrival time bound or the lower arrival time bound via a configuration utility;
an act of setting a desirable arrival time span via a user configuration utility; and
an act of determining the other arrival time bound using the desirable arrival time span and the set arrival time bound.

9. The method as recited in claim 8, wherein the act of setting a desirable arrival time span via a user configuration utility comprises at least one of the following:
an act of setting a desirable time headway between vehicles;
an act of setting a desirable rate of vehicle flow;
an act of setting a ratio indicating a desirable level of capacity usage as a ratio or percentage;
an act of setting a desirable time gap between vehicles.

10. The method as recited in claim 6, wherein the upper arrival time bound and the lower arrival time bound dynamically adapt.

11. The method as recited in claim 6, further comprising:
an act of determining the number of time-of-arrival estimates greater than the lower arrival time bound and less than the upper arrival time bound;
an act of signaling the traffic controller when the number of time-of-arrival estimates exceeds a count threshold.

12. The method as recited in claim 11, further comprising:
an act of setting the count threshold via a configuration utility.

13. The method as recited in claim 11, wherein the count threshold dynamically adapts.

14. The method as recited in claim 6, further comprising:
an act of comparing another traffic flow estimate detected within the continuous range to a bound.

15. The method as recited in claim 14, wherein the bound dynamically adapts.

16. The method as recited in claim 14, further comprising:
an act of setting the bound via a configuration utility.

17. The method as recited in claim 14, wherein the act of comparing another traffic flow estimate detected within the continuous range to a bound comprises an act of comparing another traffic flow estimate detected within the continuous range to a bound selected from among: a lower velocity bound, an upper velocity bound, a lower distance bound, an upper distance bound, a lower acceleration bound, an upper acceleration bound, a lower classification bound, an upper classification bound; a lower time headway bound, and an upper time headway bound.

18. The method as recited in claim 6, further comprising:
an act of setting a compensation factor that adjusts the estimated time-of-arrival by a percentage before comparison to the upper arrival time bound and the lower arrival time bound.

19. The method as recited in claim 1, wherein the act of determining estimated times-of-arrival of the one or more vehicles to a traffic control point associated with the monitored portion of the roadway, comprises:
an act of detecting an individual vehicle from within the received sensor data;
an act of estimating a position of the vehicle relative to the traffic control point;
an act of estimating a velocity of the vehicle; and
an act of estimating the time-of-arrival of the vehicle to the traffic control point based upon at least the estimated velocity and the estimated position.

20. The method as recited in claim 19, wherein the act of detecting an individual vehicle from within the received data comprises an act of discovering and tracking one or more vehicles within the continuous range.

21. The method as recited in claim 19, wherein the act of estimating the velocity comprises an act of monitoring the change in the estimated position of an identified vehicle over a period of time.

22. The method as recited in claim 19, wherein the act of estimating the time-of-arrival of the vehicle to the traffic control point comprise an act of mathematically dividing the estimated position by the estimated velocity.

23. The method as recited in claim 19, wherein the act of estimating the time-of-arrival of the vehicle to the traffic control point comprises an act of modeling the flow dynamics of the vehicles based upon at least the estimated speed and the estimated position.

24. The method as recited in claim 19, further comprising:
an act of determining an estimated vehicle acceleration by monitoring the change in the velocity over a period of time.

25. The method as recited in claim 19, further comprising:
an act of determining an estimated vehicle classification.

26. The method as recited in claim 25, wherein the act of determining an estimated vehicle classification comprises an act of determining one or more of an estimated vehicle length, an estimated vehicle height, and a level of received energy from a vehicle.

27. The method as recited in claim 26, wherein the act of determining an estimated vehicle length comprises an act of determining a duration of a vehicle within a transducer view.

28. The method as recited in claim 26, wherein the act of determining an estimated vehicle length comprises an act of determining an instantaneous extent of a vehicle within a continuum of transducer views.

29. The method as recited in claim 26, wherein the act of determining an estimated vehicle height comprises an act of orienting one or more transducer views to discriminate vertically.

30. The method as recited in claim 19, further comprising:
an act of estimating a time headway.

31. The method as recited in claim 1, wherein the act of reporting the level of efficiency and safety comprises an act of signaling the estimated level of efficiency and safety to a traffic control device.

32. The method as recited in claim 31, wherein the estimated level of efficiency and safety is signaled via one or more contact closures.

33. The method as recited in claim 31, wherein the level of efficiency and safety is within one or more bounds.

34. The method as recited in claim 33, further comprising: an act of setting the one or more bounds via a configuration utility.

35. The method as recited in claim 33, wherein the one or more bounds dynamically adapt.

36. The method as recited in claim 1, wherein the continuous range comprises at least one or more of the following: a continuous range as defined by a single detector and a continuous range as defined by multiple contiguous detectors grouped together for reporting the level of efficiency and safety.

37. The method as recited in claim 1, wherein the sensor is a radar.

38. The method as recited in claim 37, wherein the radar is an FMCW radar.

39. At a roadway mounted sensor, the roadway mounted sensor monitoring vehicles on a portion of a roadway, a method of monitoring traffic with the roadway mounted sensor, comprising:
an act of receiving sensor data, the sensor data indicating a presence of one or more vehicles within a continuous range of the monitored portion of the roadway, the received sensor data representing a portion of a signal that was transmitted by the roadway sensor into the portion of the roadway;
an act of using the received sensor data to determine estimated times-of-arrival of the one or more vehicles to a traffic control point associated with the monitored portion of the roadway in traffic flow while the one or more vehicles are within the continuous range;
an act of receiving further sensor data, the further sensor data indicating the presence of the one or more vehicles within the continuous range of the monitored portion of the roadway;
an act of using the received further sensor data to update estimated times-of-arrival of the one or more vehicles to the traffic control point while the one or more vehicles are within the continuous range subsequent to using the received sensor data to determine estimated times-of-arrival of the one or more vehicles; and
an act of reporting the updated estimated times-of-arrival.

40. The method as recited in claim 39, wherein the act of reporting comprises displaying the updated estimated times-of-arrival within one or more of the following: a configuration utility, a traffic management system, a computer display, a sensor display, a display of computing device.

41. The method as recited in claim 39, wherein the act of reporting the updated estimated times-of-arrival comprises:
an act of displaying a representation of uniquely identified vehicles; and
an act of displaying the updated estimated times-of-arrival with the representation of uniquely identified vehicles.

42. The method as recited in claim 39, further comprising: an act of adjusting a configuration parameter of the sensor.

43. The method as recited in claim 39, wherein the sensor is a radar.

44. The method as recited in claim 43, wherein the radar is an FMCW radar.

45. At a roadway mounted sensor, the roadway mounted sensor monitoring vehicles on a portion of a roadway, a method of monitoring traffic with the roadway mounted sensor, comprising:
an act of receiving sensor data, the sensor data indicating a presence of one or more vehicles within a continuous range of the monitored portion of the roadway, the received sensor data representing a portion of a signal that was transmitted by the roadway sensor into the portion of the roadway;
an act of dynamically adapting a location of detections for each of the one or more vehicles within the continuous range based upon a traffic characteristic, including:
an act of using the received sensor data a plurality of times to determine estimated times-of-arrival of the one or more vehicles to a traffic control point associated with the monitored portion of the roadway while the one or more vehicles are within the continuous range;
an act of reporting detections at the location of detections for each of the one or more vehicles as the location of detections dynamically adapt.

46. The method as recited in claim 45, further comprising:
an act of dynamically adapting a length of detection within the continuous range based upon the traffic characteristic.

47. The method as recited in claim 45, wherein the traffic characteristic is an estimated velocity of the vehicles.

48. The method as recited in claim 45, wherein the location of detection dynamically adapts on a lane-by-lane basis.

49. The method as recited in claim 45, wherein the length of detection dynamically adapts on a lane-by-lane basis.

50. The method as recited in claim 45, wherein the act of reporting detections at the location of detection comprises an act of reporting the detections to a traffic control device.

51. The method as recited in claim 45, wherein the sensor is a radar.

52. The method as recited in claim 51, wherein the radar is an FMCW radar.

* * * * *

UNITED STATES PATENT AND TRADEMARK OFFICE
CERTIFICATE OF CORRECTION

| | | |
|---|---|---|
| PATENT NO. | : 7,991,542 B2 | Page 1 of 3 |
| APPLICATION NO. | : 11/689441 | |
| DATED | : August 2, 2011 | |
| INVENTOR(S) | : Giles et al. | |

It is certified that error appears in the above-identified patent and that said Letters Patent is hereby corrected as shown below:

Cover page, Item 57, ABSTRACT
Line 10, change "variables" to --variable--

Column 2
Line 47, change "the stop the stop" to --the stop--
Line 53, change "defined further defined" to --further defined--

Column 3
Line 21, change "mechanisms" to --mechanisms.--
Line 23, change "allow" to --allowing--

Column 4
Line 61, change "it" to --its--

Column 5
Line 56, change "of the using" to --of using--
Line 59, change "of detector" to --of a detector--

Column 8
Line 48, change "progress" to --progresses--

Column 10
Line 35, before "generic" insert --of--

Column 12
Line 29, change "a monitoring a" to --monitoring a--
Line 62, change "time-of-arrival" to --times-of-arrival--

Signed and Sealed this
Third Day of April, 2012

David J. Kappos
*Director of the United States Patent and Trademark Office*

Column 13
Line 65, change "FIG. 1" to --FIG. 1A--

Column 14
Line 5, change "FIG. 8" to --FIG. 8A--
Line 18, change "accurately" to --accurate--
Line 20, change "FIG. 1" to --FIG. 1A--

Column 15
Line 6, change "FIG. 1" to --FIG. 1A--
Line 9, change "FIG. 1" to --FIG. 1A--
Line 18, change "can determined" to --can be determined--

Column 17
Line 8, change "can the" to --can then--
Line 27, change "estimate" to --estimated--

Column 19
Line 59, change "Method 7" to --Method 700--

Column 20
Line 21, change "act determining" to --act of determining--
Line 46, change "act determining" to --act of determining--

Column 21
Line 6, change "includes act" to --includes an act--
Line 17, change "FIG. 8" to --FIG. 8A--
Line 42, change "transducer views 104" to --transducer view 804--

Column 22
Line 29, change "FIG. 8" to --FIG. 8A--
Line 65, change "transceiver 862A2" to --transceiver 861A2--

Column 23
Line 7, change "sensors" to --sensor--

Column 24
Line 16, change "vehicles" to --vehicle's--
Line 27, change "views 804 vehicle" to --views 804, vehicle--

Column 25
Line 26, change "vehicles'" to --vehicle's--
Line 58, change "indicating a the" to --indicating the--

Column 26
Line 39, change "indefinite" to --indefinite.--

Column 27
Line 18, change "In the several" to --In several--
Line 35, change "progress" to --progresses--

Column 28
Line 61, change "wherein the an" to --wherein the--

Column 29
Line 24, change "setting the either" to --setting either--
Line 38, change "percentage;" to --percentage; and--

Column 30
Line 33, change "comprise" to --comprises--

Column 31
Line 35, remove [in traffic flow]
Line 52, change "display, a display" to --display, and a display--